United States Patent
Li et al.

(10) Patent No.: US 11,714,024 B2
(45) Date of Patent: Aug. 1, 2023

(54) VISION-BASED FATIGUE CRACK DETECTION USING FEATURE TRACKING

(71) Applicant: University of Kansas, Lawrence, KS (US)

(72) Inventors: Jian Li, Lawrence, KS (US); Xiangxiong Kong, Lawrence, KS (US)

(73) Assignee: UNIVERSITY OF KANSAS, Lawrence, KS (US)

( * ) Notice: Subject to any disclaimer, the term of this patent is extended or adjusted under 35 U.S.C. 154(b) by 0 days.

(21) Appl. No.: 16/768,165

(22) PCT Filed: Nov. 30, 2018

(86) PCT No.: PCT/US2018/063264
§ 371 (c)(1),
(2) Date: May 29, 2020

(87) PCT Pub. No.: WO2019/108905
PCT Pub. Date: Jun. 6, 2019

(65) Prior Publication Data
US 2020/0284686 A1    Sep. 10, 2020

Related U.S. Application Data

(60) Provisional application No. 62/592,771, filed on Nov. 30, 2017.

(51) Int. Cl.
*G01M 5/00* (2006.01)
(52) U.S. Cl.
CPC ........ *G01M 5/0033* (2013.01); *G01M 5/0008* (2013.01); *G01M 5/0091* (2013.01)
(58) Field of Classification Search
CPC combination set(s) only.
See application file for complete search history.

(56) References Cited

U.S. PATENT DOCUMENTS

| | | | | |
|---|---|---|---|---|
| 4,288,815 A | * | 9/1981 | Miles | ........................ H04N 5/21 348/E5.065 |
| 5,539,656 A | * | 7/1996 | Annigeri | .................. G01N 3/02 356/23 |

(Continued)

FOREIGN PATENT DOCUMENTS

| CN | 107145905 A | 9/2017 |
|---|---|---|
| GB | 2057124 A | 3/1981 |

(Continued)

OTHER PUBLICATIONS

Zhao Z, & Haldar A. (1996). Bridge fatigue damage evaluation and updating using nondestructive inspections. Engineering fracture mechanics. 53(5), (pp. 775-788).

(Continued)

*Primary Examiner* — Alexander Satanovsky
*Assistant Examiner* — Lyudmila Zaykova-Feldman
(74) *Attorney, Agent, or Firm* — Thomas | Horstemeyer, LLP

(57) ABSTRACT

A computer-vision-based fatigue crack detection approach using a short video is described. Feature tracking is applied to the video for tracking the surface motion of the monitored structure under repetitive load. Then, a crack detection and localization algorithm is established to search for differential features at different frames in the video. The effectiveness of the proposed approach is validated through testing two experimental specimens with in-plane and out-of-plane fatigue cracks. Results indicate that the proposed approach can robustly identify fatigue cracks, even when the cracks are under ambient lighting conditions, surrounded by other crack-like edges, covered by complex surface textures, or invisible to human eyes due to crack closure. The approach enables accurate quantification of crack openings under fatigue loading with good accuracy.

17 Claims, 12 Drawing Sheets

(56) References Cited

U.S. PATENT DOCUMENTS

| | | | |
|---|---|---|---|
| 7,697,727 | B2 | 4/2010 | Xu et al. |
| 8,803,977 | B2 | 4/2014 | Uchima et al. |
| 9,014,415 | B2 | 4/2015 | Chen et al. |
| 9,976,968 | B2 | 5/2018 | Ito et al. |
| 2006/0276985 | A1* | 12/2006 | Xu .................. G01C 11/025 702/81 |
| 2008/0050043 | A1* | 2/2008 | Hermosillo Valadez ................ G06T 7/32 382/128 |
| 2009/0262331 | A1* | 10/2009 | Burchardt ........... G01M 5/0091 385/12 |
| 2010/0310128 | A1* | 12/2010 | Iliopoulos ............... G06T 7/246 382/209 |
| 2011/0176014 | A1* | 7/2011 | Hong .................. H04N 23/689 348/208.4 |
| 2012/0033851 | A1* | 2/2012 | Chen ..................... G06T 7/0002 382/100 |
| 2012/0120246 | A1* | 5/2012 | Uchima ................. G01N 33/42 348/E5.09 |
| 2013/0034305 | A1* | 2/2013 | Jahanshahi ............. G06T 7/155 382/201 |
| 2013/0245879 | A1* | 9/2013 | Armijo Torres ....... G01N 19/08 702/34 |
| 2015/0125091 | A1 | 5/2015 | Gallo et al. |
| 2015/0215584 | A1* | 7/2015 | Tapia ................. G01N 21/8851 348/125 |
| 2015/0379354 | A1* | 12/2015 | Zhou ...................... G06T 7/246 382/103 |
| 2016/0133008 | A1* | 5/2016 | Kuratate .................... G06T 7/12 382/141 |
| 2016/0252464 | A1* | 9/2016 | Ito ........................... H05B 6/02 348/128 |
| 2016/0292518 | A1 | 10/2016 | Banitt et al. |
| 2017/0038307 | A1* | 2/2017 | Ohta ...................... G01N 21/88 |
| 2017/0343481 | A1* | 11/2017 | Jahanshahi ........... G06T 7/0004 |
| 2018/0189749 | A1 | 7/2018 | Takamori et al. |
| 2018/0195973 | A1 | 7/2018 | Yonekawa et al. |
| 2019/0019589 | A1* | 1/2019 | Waite ..................... G06T 7/0008 |
| 2020/0073545 | A1* | 3/2020 | Hay ........................ A61B 5/024 |
| 2020/0162665 | A1* | 5/2020 | Szasz ................... H04N 23/667 |
| 2020/0175352 | A1* | 6/2020 | Cha ...................... G06N 3/0454 |

FOREIGN PATENT DOCUMENTS

| | | |
|---|---|---|
| GB | 2542118 A | 9/2015 |
| JP | 4886999 B2 | 2/2012 |
| JP | 5221984 B2 | 6/2013 |
| KR | 10 1458487 B1 | 11/2014 |
| KR | 20160136905 A | 11/2016 |
| WO | 0225588 A3 | 3/2002 |
| WO | 2016022154 A1 | 2/2016 |
| WO | 2016022154 A1 | 2/2016 |
| WO | 2019/108905 A1 | 6/2019 |

OTHER PUBLICATIONS

Zoghlami, I., Faugeras, O., & Deriche, R. (Jun. 1997). Using geometric corners to build a 2D mosaic from a set of images. In Computer Vision and Pattern Recognition, 1997. Proceedings., 1997 IEEE Computer Society Conference on (pp. 420-425). IEEE.

Oberhelman, D. (2015). Road to Growth: The Case for Investing in America's Transportation Infrastructure. Business Roundtable. Retrieved from: http://businessroundtable.org/sites/default/files/2015.09.16%20Infrastructure%20Report%20-%20Final.pdf.

Mahmoud, H. (2017). Upgrading our infrastructure: Targeting repairs for locks, dams and bridges. The Conversation, Mar. 13, 2017.

Lichtenstein, A.G. (1993). The Silver Bridge collapse recounted. Journal of Performance of Constructed Facilities, 7(4), (pp. 249-261).

Fang, Z., Li, A., Li, W., and Shen, S. (2017). Wind-induced fatigue analysis of high-rise steel structures using equivalent structural stress method. Applied Sciences, 7, 71. (pp. 1-18).

Bothma, J.G. (2012). Transmission line tower collapse investigation: a case study. IEEE Power and Energy Society Conference and Exposition in Africa: Intelligent Grid Integration of Renewable Energy Resources (PowerAfrica), Johannesburg, South Africa, Jul. 9-13.

Federal Highway Administration (FHWA). (2004). National bridge inspection standards, Federal Register, 69 (239) (pp. 74420-74439).

Zhao Z, and Haldar A. (1996). Bridge fatigue damage evaluation and updating using nondestructive inspections. Engineering fracture mechanics. 53(5), (pp. 775-788).

Graybeal, B. A., Phares, B. M., Rolander, D. D., Moore, M., & Washer, G. (2002). Visual inspection of highway bridges Journal of nondestructive evaluation, 21(3), (pp. 67-83.).

Staszewski, W. J., Lee, B. C., & Traynor, R. (2007). Fatigue crack detection in metallic structures with Lamb waves and 3D laser vibrometry. Measurement Science and Technology, 18(3), (pp. 727-739).

Leong, W. H., Staszewski, W. J., Lee, B. C., & Scarpa, F. (2005). Structural health monitoring using scanning laser vibrometry: III. Lamb waves for fatigue crack detection. Smart Materials and Structures, 14(6), (pp. 1387-1395).

Ihn, J. B., & Chang, F. K. (2004). Detection and monitoring of hidden fatigue crack growth using a built-in piezoelectric sensor/actuator network: I. Diagnostics. Smart materials and structures, 13(3), (pp. 609-620).

Andrade, F. A., Esat, I., & Badi, M. N. M. (2001). A new approach to time-domain vibration condition monitoring: gear tooth fatigue crack detection and identification by the Kolmogorov-Smirnov test. Journal of Sound and vibration, 240(5), (pp. 909-919.).

Blunt, D. M., & Keller, J. A. (2006). Detection of a fatigue crack in a UH-60A planet gear carrier using vibration analysis. Mechanical Systems and Signal Processing, 20(8), (pp. 2095-2111.).

Yao, Y., & Glisic, B. (2015). Detection of steel fatigue cracks with strain sensing sheets based on large area electronics. Sensors, 15(4), (pp. 8088-8108.).

Wu, L., Mokhtari, S., Nazef, A., Nam, B., & Yun, H. B. (2016) "Improvement of crack-detection accuracy using a novel crack defragmentation technique in image-based road assessment". Journal of Computing in Civil Engineering, 30(1), 04014118.

Iyer, S., & Sinha, S. K. (2005). A robust approach for automatic detection and segmentation of cracks in underground pipeline images. Image and Vision Computing, 23(10), (pp. 921-933.).

Cha, Y. J., Choi, W., & Büyüköztürk, O. (2017). Deep Learning-Based Crack Damage Detection Using Convolutional Neural Networks. Computer-Aided Civil and Infrastructure Engineering, 32(5), (pp. 361-378.).

Zhang, L., Yang, F., Zhang, Y. D., & Zhu, Y. J. (Sep. 2016). Road crack detection using deep convolutional neural network. In Image Processing (ICIP), 2016 IEEE International Conference on (pp. 3708-3712). IEEE.

Zhang, A., Wang, K. C., Li, B., Yang, E., Dai, X., Peng, Y., & Chen, C. (2017). Automated Pixel-Level Pavement Crack Detection on 3D Asphalt Surfaces Using a Deep-Learning Network. Computer-Aided Civil and Infrastructure Engineering, 32(10), (pp. 805-819.).

Xu, Y., Bao, Y., Chen, J., Zuo, W., & Li, H. (2018). Surface fatigue crack identification in steel box girder of bridges by a deep fusion convolutional neural network based on consumer-grade camera images. Structural Health Monitoring, vol. 18(3), (pp. 653-674).

Chen, F. C., & Jahanshahi, M. R. (2017). NB-CNN: Deep Learning-based Crack Detection Using Convolutional Neural Network and Naive Bayes Data Fusion. IEEE Transactions on Industrial Electronics. vol. 65(5), (pp. 4392-4400).

Patel, T. H., & Darpe, A. K. (2008). Influence of crack breathing model on nonlinear dynamics of a cracked rotor. Journal of Sound and Vibration, 311(3-5), (pp. 953-972.).

Chondros, T. G., Dimarogonas, A. D., & Yao, J. (2001). Vibration of a beam with a breathing crack. Journal of Sound and vibration, 239(1), (pp. 57-67.).

Polák, J., & Zezulka, P. (2005). Short crack growth and fatigue life in austenitic-ferritic duplex stainless steel. Fatigue & Fracture of Engineering Materials & Structures, 28(10), (pp. 923-935.).

(56) References Cited

OTHER PUBLICATIONS

Kong, X., & Li, J. (2018). Vision-Based Fatigue Crack Detection of Steel Structures Using Video Feature Tracking. Computer-Aided Civil and Infrastructure Engineering. In press (33) (pp. 783-799).
Rueckert, D., Sonoda, L. I., Hayes, C., Hill, D. L., Leach, M. O., & Hawkes, D. J. (1999). Nonrigid registration using free-form deformations: application to breast MR images. IEEE transactions on medical imaging, 18(8), (pp. 712-721.).
Bentoutou, Y., Taleb, N., Kpalma, K., & Ronsin, J. (2005). An automatic image registration for applications in remote sensing IEEE transactions on geoscience and remote sensing, 43(9), (pp. 2127-2137).
Dwith Chenna, Y. N., Ghassemi, P., Pfefer, T. J., Casamento, J., & Wang, Q. (2018). Free-Form Deformation Approach for Registralion of Visible and Infrared Facial Images in Fever Screening. Sensors, 18(1), 125.
Kong, X., & Li, J. (2018). Image registration-based bolt loosening detection of steel joints. Sensors, 18(4), 1000.
Lucas, Bruce D. and Takeo Kanade. An Iterative Image Registration Technique with an Application to Stereo Vision, Proceedings of the 7th International Joint Conference on Artificial Intelligence, Apr. 1981, (pp. 674-679.).
Torr, P. H., & Zisserman, A. MLESAC: A new robust estimator with application to estimating image geometry. Computer Vision and Image Understanding, 1996, 78(1), (pp. 138-156.).
Leutenegger, S., Chli, M., & Siegwart, R. Y. BRISK: Binary robust invariant scalable keypoints. In Computer Vision (ICCV), 2011 IEEE International Conference on (pp. 2548-2555). IEEE. Nov. 2011.
Tareen, S. A. K., & Saleem, Z. (Mar. 2018). A comparative analysis of SIFT, SURF, KAZE, AKAZE, ORB, and BRISK. In Computing, Mathematics and Engineering Technologies (iCoMET), 2018 International Conference on (pp. 1-10). IEEE.
Thirion, J. P. (1998). Image matching as a diffusion process: an analogy with Maxwell's demons. Medical Image Analysis, 2(3), (pp. 243-260.).
Vercauteren, T., Pennec, X., Perchant, A., & Ayache, N. (2009). Diffeomorphic demons: Efficient non-parametric image registration. NeuroImage, 45(1), (pp. S61-S72.).
Zitova, B., & Flusser, J. Image registration methods: a survey. Image and vision computing, 2003, 21(11), (pp. 977-1000).
Paris, S., Hasinoff, S. W., & Kautz, J. (2011). Local Laplacian filters: Edge-aware image processing with a Laplacian pyramid. ACM Trans. Graph., 30(4), (pp. 68-1-68:11).
Aubry, M., Paris, S., Hasinoff, S. W., Kautz, J., & Durand, F. (2014). Fast local laplacian filters: Theory and applications. ACM Transactions on Graphics (TOG), 33(5), (pp. 167:1-167:14).
Jajich, D., & Schultz, A. E. (2003). Measurement and analysis of distortion-induced fatigue in multigirder steel bridges. Journal of Bridge Engineering, 8(2), (pp. 84-91.).
Canny, J. (1986). A computational approach to edge detection. In Readings in Computer Vision vol. Pami-8 No. 6 (pp. 679-698).
Cha, Y. J., Choi, W., Suh, G., Mahmoudkhani, S., & Büyüköztürk, O. (2018). Autonomous structural visual inspection using region-based deep learning for detecting multiple damage types. Computer-Aided Civil and Infrastructure Engineering, 33(9), (pp. 731-747). https://doi.org/10.1111/mice.12334.
Cha, Y. J., You, K., & Choi, W. (2016). Vision-based detection of loosened bolts using the Hough transform and support vector machines. Automation in Construction, 71, (pp. 181-188.) https://doi.org/10.1016/j.autcon.2016.06.008.
ASTM International. (2015). Standard test method for measurement of fracture toughness. ASTM International, https://doi.org/10.1520/E1820-15A.
Jiang, Y.; Zhang, M.; & Lee, C. H. A study of early stage self-loosening of bolted joints. Journal of Mechanical Design, 2003, 125(3), (pp. 518-526.).
Kang, J., & Chang, F. K. Detection of bolt loosening in C—C composite thermal protection panels: I. Diagnostic principle. Smart Materials and Structures, 2006, 15(2), (pp. 581-590).

Zhao X, Gao H, Zhang G, et al. Active health monitoring of an aircraft wing with embedded piezoelectric sensor/actuator network: I. Defect detection, localization and growth monitoring. Smart Mater Struct 2007; 16(4): (pp. 1208-1217).
Nikravesh, S. M. Y., & Goudarzi, M. A Review Paper on Looseness Detection Methods in Bolted Structures. Latin American Journal of Solids and Structures, 2017, 13 (pp. 2153-2176).
Wu, J., Cui, X., & Xu, Y. A Novel RFID-Based Sensing Method for Low-Cost Bolt Loosening Monitoring. Sensors, 2016, 16(2), 168.
International Search Report for PCT/US201 8/063264 dated Apr. 3, 2019.
R.S. Adhikari, et al. (2014) "Image-based Retrieval of Concrete Crack Properties for Bridge Inspection," ("the Adhikari article"), (pp. 180-194).
Abdel-Qader, I., Abudayyeh, O., & Kelly, M. E. (2003). Analysis of edge-detection techniques for crack identification in bridges. Journal of Computing in Civil Engineering, 17(4), (pp. 255-263.).
ASTM International. (2015). "Standard test method for measurement of fracture toughness." ASTM International, (pp. 1-65).
Bay, H., Tuytelaars, T., & Van Gool, L. (May 2006). Surf: Speeded up robust features. In European conference on computer vision (pp. 404-417). Springer Berlin Heidelberg.
Canny, J. (1986). A computational approach to edge detection. IEEE Transactions on pattern analysis and machine intelligence, (6), (pp. 679-698.).
Cha, Y. J., Choi, W., & Buyukozturk, O. (2017). Deep learning-based crack damage detection using convolutional neural network. Computer-Aided Civil and Infrastructure Engineering, 32(3), 2013-2014 (pp. 361-378).
Chen, F. C., Jahanshahi, M. R., Wu, R. T., & Joffe, C. (2017). A texture-Based Video Processing Methodology Using Bayesian Data Fusion for Autonomous Crack Detection on Metallic Surfaces. Computer-Aided Civil and Infrastructure Engineering, 32(4), (pp. 271-287.).
Chen, J. G., Davis, A., Wadhwa, N., Durand, F., Freeman, W. T., & Büyüköztürk, O. (2016). Video Camera-Based Vibration Measurement for Civil Infrastructure Applications. Journal of Infrastructure Systems, 12 (3), (pp. B4016013:1-B4016013:1-B4016013:11.).
Chen, J. G., Wadhwa, N., Cha, Y. J., Durand, F., Freeman, W. T., & Buyukozturk, O. (2015). Modal identification of simple structures with high-speed video using motion magnification. Journal of Sound and Vibration, 345, (pp. 58-71.).
Coifman, B., Beymer, D., McLauchlan, P., & Malik, J. (1998). A real-time computer vision system for vehicle tracking and traffic surveillance. Transportation Research Part C: Emerging Technologies, 6(4), (pp. 271-288.).
Dias-da-Costa, D., Valença, J., Júlio, E., & Araújo, H. (2016). Crack propagation monitoring using an image deformation approach. Structural Control and Health Monitoring. e1973. doi: 10.1002/stc. 1973. (pp. 1-14).
El-Hakim, S. F., Beraldin, J. A., Picard, M., & Godin, G. (2004). Detailed 3D reconstruction of large-scale heritage sites with integrated techniques. IEEE Computer Graphics and Applications, 24(3), (pp. 21-29.).
Feng, D., & Feng, M. Q. (2017). Experimental validation of cost-effective vision-based structural health monitoring. Mechanical Systems and Signal Processing, 88, (pp. 199-211.).
Feng, M. Q., Fukuda, Y., Feng, D., & Mizuta, M. (2015). Nontarget vision sensor for remote measurement of bridge dynamic response. Journal of Bridge Engineering, 20(12), (pp. 04015023:1-04015023:12).
Glišić, B., Yao, Y., Tung, S. T. E., Wagner, S., Sturm, J. C., & Verma, N. (2016). Strain Sensing Sheets for Structural Health Monitoring Based on Large-Area Electronics and Integrated Circuits. Proceedings of the IEEE, 104(8), (pp. 1513-1528.).
Haghani, R., Al-Emrani, M., & Heshmati, M. (2012). Fatigue-prone details in steel bridges. Buildings, 2(4), (pp. 456-476.).
Harris, C., & Stephens, M. (Aug. 1988). A combined corner and edge detector. In Alvey vision conference 15 (50), (pp. 147-151.).
Hassel, H. L., Bennett, C. R., Matamoros, A. B., & Rolfe, S. T. (2013). Parametric analysis of cross-frame layout on distortion-induced fatigue in skewed steel bridges. Journal of Bridge Engineering, 18(7), (pp. 601-611.).

(56) References Cited

OTHER PUBLICATIONS

Hutt, T., & Cawley, P. (2009). Feasibility of digital image correlation for detection of cracks at fastener holes. NDT & e International, 42(2), (pp. 141-149.).
Ihn JB, and Chang FK. (2004). Detection and monitoring of hidden fatigue crack growth using a built-in piezoelectric sensor/actuator network: I. Diagnostics. Smart materials and structures. 13: (pp. 608-620).
Iyer, S., & Sinha, S. K. (2006). Segmentation of pipe images for crack detection in buried sewers. Computer-Aided Civil and Infrastructure Engineering, 21(6), (pp. 395-410.).
Jahanshahi, M. R., & Masri, S. F. (2012). Adaptive vision-based crack detection using 3D scene reconstruction for condition assessment of structures. Automation in Construction, 22, (pp. 567-576.).
Kalal, Z., Mikolajczyk, K., & Matas, J. (Aug. 2010). Forward-backward error: Automatic detection of tracking failures. In Pattern recognition (ICPR), 2010 20th international conference on (pp. 2756-2759). IEEE.
Kong, X., Li, J., Bennett, C., Collins, W., & Laflamme, S. (2016). Numerical simulation and experimental validation of a large-area capacitive strain sensor for fatigue crack monitoring. Measurement Science and Technology, 27(12), 124009.
Kong, X., Li, J., Collins, W., Bennett, C., Laflamme, S., & Jo, H. (2017). A large-area strain sensing technology for monitoring fatigue cracks in steel bridges. Smart Materials and Structures, 26(8).
Lowe, D. G. (2004). Distinctive image features from scale-invariant keypoints. International journal of computer vision, 60(2), (pp. 91-110.).
Lucas, Bruce D. and Takeo Kanade (1981). An Iterative Image Registration Technique with an Application to Stereo Vision, Proceedings of the 7th International Joint Conference on Artificial Intelligence, Apr. 1981, (pp. 674-679).
Man, S. H., & Chang, C. C. (2016). Design and performance tests of a LED-based twodimensional wireless crack propagation sensor. Structural Control and Health Monitoring, 23(4), (pp. 668-683.).
Mokhtari, S., Wu, L., & Yun, H. B. (2017). Statistical Selection and Interpretation of Imagery Features for Computer Vision-Based Pavement Crack-Detection Systems Journal of Performance of Constructed Facilities, 31(5), 04017054.
Nishikawa, T., Yoshida, J., Sugiyama, T., & Fujino, Y. (2012). Concrete crack detection by multiple sequential image filtering. Computer-Aided Civil and Infrastructure Engineering, 27(1), (pp. 29-47.).
Park, J. W., Lee, J. J., Jung, H. J., & Myung, H. (2010). Vision-based displacement measurement method for high-rise building structures using partitioning approach. NDT & E International, 43(7), (pp. 642-647.).
Polák, I., & Zezulka, P. (2005). Short crack growth and fatigue life in austenitic-ferritic duplex stainless steel. Fatigue & Fracture of Engineering Materials & Structures, 28(10), (pp. 923-935.).
Roberts, T., & Talebzadeh, M. (2003). Acoustic emission monitoring of fatigue crack propagation. Journal of Constructional Steel Research, 59(6), (pp. 695-712.).
Rosten, E., & Drummond, T. (Oct. 2005). Fusing points and lines for high performance tracking. In Tenth IEEE International Conference on Computer Vision (ICCV'05) vol. 1 (vol. 2, pp. 1508-1515). IEEE.
Rupil, J., Roux, S., Hild, F., & Vincent, L. (2011). Fatigue microcrack detection with digital image correlation. The Journal of Strain Analysis for Engineering Design, 46(6) (pp. 1-57).
Saxena, A., & Hudak, S. J. (1978). Review and extension of compliance information for common crack growth specimens International Journal of Fracture, 14(5), (pp. 453-468.).
Shi, J. (Jun. 1994). Good features to track. In Computer Vision and Pattern Recognition, 1994. Proceedings CVPR'94., 1994 IEEE Computer Society Conference on (pp. 593-600). IEEE.
Sinha, S. N., Frahm, J. M., Pollefeys, M., & Genc, Y. (May 2006). GPU-based video feature tracking and matching. In EDGE, Workshop on Edge Computing Using New Commodity Architectures (vol. 278, p. 4321:1-15).
Sobel, I., & Feldman, G. (1973). A 3x3 isotropic gradient operator for image processing. a talk at the Stanford Artificial Project in, 271-272.
Sutton, M. A., Zhao, W., McNeill, S. R., Helm, J. D., Piascik, R. S., & Riddell, W. T. (1999). Local crack closure measurements: Development of a measurement system using computer vision and a far-field microscope. In Advances in fatigue crack closure measurement and analysis: second volume. ASTM International, (pp. 145-156).
Ta, D. N., Chen, W. C., Gelfand, N., & Pulli, K. (Jun. 2009). Surftrac: Efficient tracking and continuous object recognition using local feature descriptors. In Computer Vision and Pattern Recognition, 2009. CVPR 2009. IEEE Conference on (pp. 2937-2944). IEEE.
Tomasi, Carlo and Takeo Kanade (1991). Detection and Tracking of Point Features, Computer Science Department, Carnegie Mellon University, Apr. 1991.
Vanlanduit, S., Vanherzeele, J., Longo, R., & Guillaume, P. (2009). A digital image correlation method for fatigue test experiments. Optics and Lasers in Engineering, 47(3), (pp. 371-378.).
Wahbeh, A. M., Caffrey, J. P., & Masri, S. F. (2003). A vision-based approach for the direct measurement of displacements in vibrating systems. Smart materials and structures, 12(5), (pp. 785-794).
Xu, Y., Li, S., Zhang, D., Jin, Y., Zhang, F., Li, N., & Li, H. (2017). Identification framework for cracks on a steel structure surface by a restricted Boltzmann machines algorithm based on consumer-grade camera images. Structural Control and Health Monitoring, (pp. 1-20).
Yamaguchi, T., Nakamura, S., Saegusa, R., & Hashimoto, S. (2008). Image-Based Crack Detection for Real Concrete Surfaces. IEEJ Transactions on Electrical and Electronic Engineering, 3(1), (pp. 128-135.).
Fang, Y., Dorn, C., Mancini, T., Talken, Z., Kenyon, G., Farrar, C., & Mascareñas, D. (2017). Blind identification of full-field vibration modes from video measurements with phase-based video motion magnification. Mechanical Systems and Signal Processing, 85, (pp. 567-590.).
Yeum, C. M., & Dyke, S. J. (2015). Vision-Based Automated Crack Detection for Bridge Inspection. Computer-Aided Civil and Infrastructure Engineering, 30(10), (pp. 759-770.).
Yoon, H., Elanwar, H., Choi, H., Golparvar-Fard, M., & Spencer, B. F. (2016). Target-free approach for vision-based structural system identification using consumer-grade cameras. Structural Control and Health Monitoring, (pp. 1405-1416).
Zhang, A., Wang, K.C., Li, B., Yang, E., Dai, X., Peng, Y., Fei, Y., Liu, Y., Li, J.Q. and Chen, C. (2017), Automated Pixel-Level Pavement Crack Detection on 3D Asphalt Surfaces Using a Deep-Learning Network. Computer-Aided Civil and Infrastructure Engineering. doi:10.1111/mice.12297 (pp. 805-819).
Khuc, T., & Catbas, F. N. Structural Identification Using Computer Vision-Based Bridge Health Monitoring. Journal of Structural Engineering, 2017, 144(2), (pp. 04017202:1-04017202:13).
Feng, D., & Feng, M. Q. Vision-based multipoint displacement measurement for structural health monitoring. Structural Control and Health Monitoring, 2016, 23(5), (pp. 876-890.).
Abdelbarr, M., Chen, Y. L., Jahanshahi, M. R., Masri, S. F., Shen, W. M., & Qidwai, U. A. 3D dynamic displacement field measurement for structural health monitoring using inexpensive RGB-D based sensor. Smart Materials and Structures, 2017, 26(12), (pp. 125016:1-125016.:23).
Kohut, P., Holak, K., & Martowicz, A. An uncertainty propagation in developed vision based measurement system aided by numerical and experimental tests. Journal of Theoretical and Applied Mechanics, 2012, 50(4), (pp. 1049-1061.).
Keum, C. M., Dyke, S. J., & Ramirez, J. Visual data classification in post-event building reconnaissance. Engineering Structures, 2018, 155, (pp. 16-24.).
Cha, Y. J., Choi, W., Suh, G., Mahmoudkhani, S., & Büyüköztürk, O. Autonomous Structural Visual Inspection Using Region-Based Deep Learning for Detecting Multiple Damage Types. Computer-Aided Civil and Infrastructure Engineering. 2017 (33) (pp. 731-747).

(56) References Cited

OTHER PUBLICATIONS

Kong, X., and Li, J. Vision-based fatigue crack detection of steel structures using video feature tracking. Computer-Aided Civil and Infrastructure Engineering, 2018, In Press. (33) (pp. 783-799).

Yoon, H., Hoskere, V., Park, J. W., & Spencer, B. F. Cross-correlation-based structural system identification using unmanned aerial vehicles. Sensors, 2017, 17(9), 2075.

Kim, H., Lee, J., Ahn, E., Cho, S., Shin, M., & Sim, S. H. Concrete Crack Identification Using a UAV Incorporating Hybrid Image Processing. Sensors, 2017, 17(9), 2052.

Ong, W. H., Chiu, W. K., Kuen, T., & Kodikara, J. Determination of the State of Strain of Large Floating Covers Using Unmanned Aerial Vehicle (UAV) Aided Photogrammetry. Sensors, 2017, 17(8), 1731.

Escobar-Wolf, R., Oommen, T., Brooks, C. N., Dobson, R. J., & Ahlborn, T. M. Unmanned Aerial Vehicle (UAV)-Based Assessment of Concrete Bridge Deck Delamination Using Thermal and Visible Camera Sensors: A Preliminary Analysis. Research in Nondestructive Evaluation, 2017, (pp. 1-16.).

Xu, Y., & Brownjohn, J. M. Review of machine-vision based methodologies for displacement measurement in civil structures. Journal of Civil Structural Health Monitoring, 2017, (pp. 91-110).

Park, J., Kim, T., & Kim, J. Image-based bolt-loosening detection technique of bolt joint in steel bridges. In 6th International conference on advances in experimental structural engineering, University of Illinois, Urbana-Champaign. 2015.

Park, J. H., Huynh, T. C., Choi, S. H., & Kim, J. T. Vision-based technique for bolt-loosening detection in wind turbine tower. Wind and Structures, 2015, 21(6), (pp. 709-726.).

Ramana, L., Choi, W., and Cha, Y. J. Fully automated vision-based loosened bolt detection using the Viola-Jones algorithm, Structural Health Monitoring, 2018, In press. vol. 18(2) (pp. 422-434).

Crum, W. R., Hartkens, T., & Hill, D. L. G. Non-rigid image registration: theory and practice. The British journal of radiology, 77(suppl_2), 2004, (pp. S140-S153.).

Klein, S., Staring, M., Murphy, K., Viergever, M. A., & Pluim, J. P. Elastix: a toolbox for intensity-based medical image registration. IEEE transactions on medical imaging, 2010, 29(1), (pp. 196-205).

Achanta, R., Shaji, A., Smith, K., Lucchi, A., Fua, P., & Süsstrunk, S. SLIC superpixels compared to state-of-the-art superpixel methods. IEEE transactions on pattern analysis and machine intelligence, 2012, 34(11), (pp. 2274-2281.).

Yoon, H., Elanwar, H., Choi, H., Golparvar-Fard, M., & Spencer, B. F. Target-free approach for vision-based structural system identification using consumer-grade cameras. Structural Control and Health Monitoring, 2016, 23(12), (pp. 1405-1416.).

Feng, D., & Feng, M. Q. Computer vision for SHM of civil infrastructure: From dynamic response measurement to damage detection—A review. Engineering Structures, 2018, 156, (pp. 105-117.).

Chen, J. G., Davis, A., Wadhwa, N., Durand, F., Freeman, W. T., & Büyüköztürk, O. Video Camera-Based Vibration Measurement for Civil Infrastructure Applications. Journal of Infrastructure Systems, 2016, 23(3), (pp. 64016013:1-B4016013:11.).

Brownjohn, J. M. W., Xu, Y., & Hester, D. Vision-based bridge deformation monitoring. Frontiers in Built Environment, 2017, 3, 23.

Guo, J. Dynamic displacement measurement of large-scale structures based on the Lucas-Kanade template tracking algorithm. Mechanical Systems and Signal Processing, 2016, 66, (pp. 425-436.).

American Society of Civil Engineers (2017). Infrastructure report card. https://www.infrastructurereportcard.org/.

Chen, W.F and Duan, L. (2014). Bridge Engineering Handbook (2nd Edition): Construction and maintenance. CRC Press, Boca Raton. (pp. A-629) *Separated into 6 separate PDF's due to size*.

Zhao, Y., & Roddis, W. M. K. (2004). Fatigue Prone Steel Bridge Details: Investigation and Recommended Repairs, K-TRAN: KU-99-2, Final Report Kansas Department of Transportation, Topeka, KS.

McElrath, K. S. (2015). Field, Laboratory, and Analytical Investigation of Angles-with-Plate Retrofit for Distortion-Induced Fatigue in Steel Bridges (Doctoral dissertation, University of Kansas). http://hdl.handle.net/1808/20980 the date of last access: Sep. 1, 2018 (pp. A-345) *Separated into 3 separate documents due to size*.

Okugawa, M. Bolt loosening detection methods by using smart washer adopted 4SID. In Proceedings of the 45th AIAA/ASME/ASCE/AHS/ASC Structures, Structural Dynamics & Materials Conference. Apr. 2004 (pp. 1-12).

Sun, H., Liu, Q., & Fang, L. (2018). Research on Fatigue Crack Growth Detection of M (T) Specimen Based on Image Processing Technology. Journal of Failure Analysis and Prevention, 18(4). https://doi.org/10.1007/s11668-018-0493-6.

International Search Report and Written Opinion of PCT/US2018/063264 dated Apr. 3, 2019.

International Search Report and Written Opinion of PCT/US2019/023581 dated Jun. 7, 2019.

International Search Report and Written Opinion of PCT/US2019/047272 dated Nov. 15, 2019.

* cited by examiner

VISION-BASED FATIGUE CRACK DETECTION USING FEATURE TRACKING

CROSS-REFERENCE TO RELATED APPLICATIONS

This application claims the benefit of U.S. Provisional Application No. 62/592,771, filed Nov. 30, 2017, the entire contents of which is hereby incorporated herein by reference.

BACKGROUND

Civil infrastructure, such as buildings, roads, bridges, towers, etc. are susceptible to structural damage and possible failure due to the significant loads that they sustain over long periods of time. In particular, fatigue cracks can be a critical structural concern for steel highway bridges. Caused by the repetitive traffic loads, fatigue cracks are usually small when initiated, making them challenging to be detected at an early stage. However, depending on the structural boundary conditions and layout, fatigue cracks may develop rapidly and significantly impair structural integrity, possibly leading to catastrophic structural failures.

Human inspection has been relied upon to visually examine fatigue cracks on steel bridges. However, human inspection is time consuming, labor intensive, cost inefficient, and prone to error. Although non-destructive testing (NDT) techniques using acoustic emissions and piezoelectric sensors can improve inspection accuracy, they require additional power for generating source signals and increase the complexity of monitoring systems. Strain-based monitoring technologies can also detect fatigue cracks by sensing abrupt strain changes caused by cracking. Nevertheless, the extra work required for the installation of sensors and cabling leads to complex and expensive monitoring systems.

SUMMARY

According to one embodiment, a method for fatigue crack detection is described. The method includes capturing a video of a structure under dynamic loading, detecting a plurality of feature points within a region of interest in a number of frames of the video, and tracking, across the number of frames of the video, relative movement among the plurality of feature points. The method further includes detecting a crack in the structure based on the relative movement, and qualifying at least one characteristic of the crack.

Tracking the relative movement includes, for each feature point among the plurality of feature points, identifying a subset of the plurality of feature points within a localized circular region from the feature point. Tracking the relative movement further includes, for each subset of the plurality of feature points, evaluating the subset for differential or uniform movement among the plurality of feature points within the localized circular region of the subset. For each feature point among the plurality of feature points, the localized circular region from the feature point can be defined by a radial distance r from the feature point.

In some cases, the method includes calculating at least one geometric transformation matrix between an initial frame of the video and a subsequent frame of the video to compensate for at least one geometric distortion introduced by motion of the image capture device used to capture the video.

Detecting the crack includes, for each subset having differential movement among the plurality of feature points within the localized circular region, highlighting a central feature point within the subset to be included in a detected point cloud. The detected point cloud surrounds a path of the crack, and qualifying at least one characteristic of the crack includes deploying a pair of windows within the detected point cloud to determine at least one of a size, a shape, or a length of the crack.

According to another embodiment, a system for fatigue crack detection is described. The system includes a memory device configured to store computer-readable instructions thereon and at least one processing device configured, through execution of the computer-readable instructions, to perform various functions. In one example, the processing device is configured to detect a plurality of feature points within a region of interest in a number of frames of a video of a structure under dynamic loading. The processing device is further configured to track, across the number of frames of the video, relative movement among the plurality of feature points. The processing device is further configured to detect a crack in the structure based on the relative movement, and qualify a nature of the crack.

To track relative movement, the at least one processing device is further configured to, for each feature point among the plurality of feature points, identify a subset of the plurality of feature points within a localized circular region from the feature point. The at least one processing device is also configured to, for each subset of the plurality of feature points, evaluate the subset for differential or uniform movement among the plurality of feature points within the localized circular region of the subset.

In some cases, the at least one processing device is further configured to calculate at least one geometric transformation matrix between an initial frame of the video and a subsequent frame of the video to compensate for at least one geometric distortion introduced by motion of the image capture device used to capture the video.

To detect the crack, the at least one processing device is further configured to, for each subset having differential movement among the plurality of feature points within the localized circular region, highlight a central feature point within the subset to be included in a detected point cloud. The detected point cloud surrounds a path of the crack. To qualify at least one characteristic of the crack, the at least one processing device is further configured to deploy a pair of windows within the detected point cloud to determine at least one of a size, a shape, or a length of the crack.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
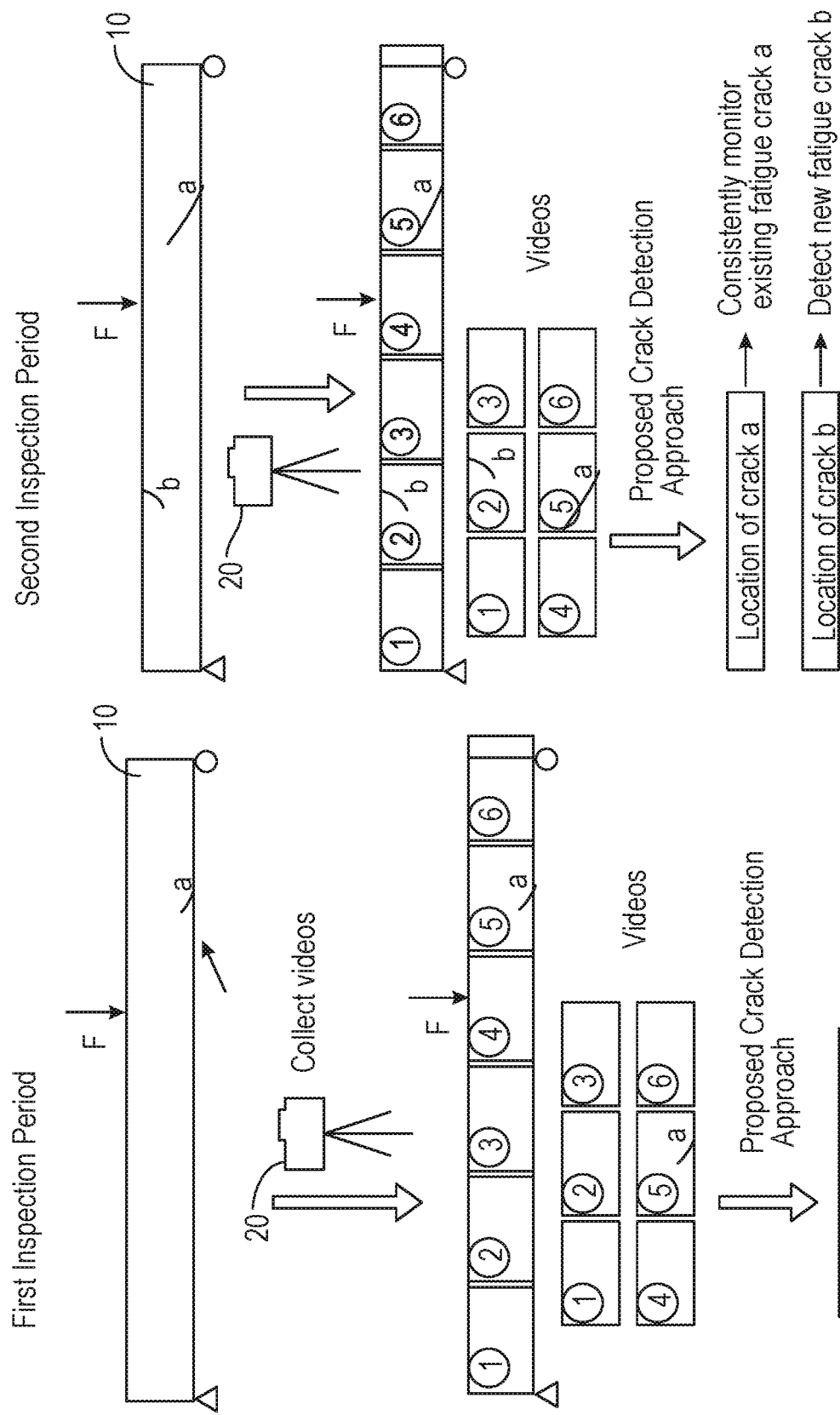
FIG. 1 illustrates a representative strategy to implement a computer-vision-based crack detection approach according to various embodiments described herein.

As noted above, fatigue cracks can be a critical structural concern in steel bridges and other items of infrastructure. Fatigue cracks developed under repetitive loads are one of the major threats to the structural integrity of steel bridges. Human inspection is a common approach for fatigue crack detection, but is time consuming, labor intensive, and lacks reliability.

Computer-vision-based crack detection methods have shown potential as contactless, easy-to-deploy, and low-cost detection methods. Some computer-vision-based image processing techniques (IPTs) can efficiently search for and identify localized edge features of cracks in images. IPT-based methods include edge detection, image segmentation, percolation processing, sequential image filtering, and others processes. However, these methods mainly rely on finding the edge features of cracks, and it can be challenging for them to distinguish true cracks from crack-like edges such as structural boundaries, wires, or corrosion marks.

Certain IPT-based methods have been developed for extracting additional features of cracks beyond edge features. For example, a statistical approach was proposed based on multiple features of cracks including crack length, width, and orientation, enabling a more robust identification of pavement cracks. Another approach applied a three-dimensional (3D) reconstruction technology to create a 3D point cloud of a concrete crack to extract the crack penetration depth. Still another approach proposed learning the invariant features from a large volume of images using deep learning technologies to achieve robust crack detection on concrete components in various lighting conditions. Similar deep-learning based approaches have been reported to detect cracks on a steel box girder and asphalt surfaces. Nevertheless, false positive results can still occur using these advanced methods.

A common aspect of many IPT-based methods is that only static features are utilized in crack detection. For infrastructure under service loads, the existence of a crack opening on a structural surface can create discontinuities in the pattern of surface motion (e.g., a crack that moves perpendicularly to the crack length direction). Tracking the surface motion and analyzing the pattern to uncover such discontinuities is a potential approach to detect and quantify cracks with high accuracy. This concept has been applied with Digital Image Correlation (DIC) technologies for crack detection by tracking the discontinuity of certain displacements. However, these methods require expensive equipment, such as macro lenses, microscopes, special light sources, or surface treatments.

Rather than merely relying on static images, additional information about cracks can be obtained by tracking the surface motion of a structure through a series of images, and certain video-based concepts have been adopted in the field. Example video-based concepts include target-based approaches and motion magnification-based approaches. However, these approaches have focused on tracking the global responses of structures, but no research has been reported for detecting fatigue cracks of structures through video-based surface motion tracking.

In the context outlined above, a computer-vision-based fatigue detection approach is described herein. The approach can include capturing video of a target structure, such as a bridge or other structure, under dynamic service load. The video can be captured using any suitable camera, including consumer-grade digital cameras. The camera can be positioned at various angles or positions with respect to the structure under evaluation, and the approach can be applied in various lighting conditions including ambient lighting conditions.

The approach can include detecting feature points within one or more regions of interest in frames of the video. A region of interest can be selected based on suitable dimensions, such as 1700 pixels×900 pixels in a video with resolution of 1920 pixels×1080 pixels. In the region of interest, the feature points can be detected using a number of different feature point detection algorithms based, for example, on gradient changes in horizontal and vertical directions among pixels in the frames of the video.

Once the feature points are detected, the approach can include tracking relative movement of the feature points across a number of frames of the video. More particularly, the tracking can include, for each particular feature point among the detected feature points, identifying a subset of the detected feature points within a localized circular region from the particular feature point. Then, for each subset of the detected of feature points, evaluating the subset for differential or uniform movement among the detected feature points within the subset. The localized circular region can be defined by a radial distance r, which is a variable that can be tailored, from a central feature point in the localized circular region.

The particular feature points of any subsets that exhibit differential movement can be highlighted as feature points to be included in a point cloud indicative of a crack in the structure under evaluation. The point cloud can be analyzed to identify the path of the crack. Using the information in the point cloud, the approach can also include quantifying the crack and the path of the crack, such as determining a size of an opening of the crack, determining a length of the crack, and determining other characteristics of the crack.

Thus, using a relatively short video taken by a digital camera, feature tracking is applied to track the motion on the surface of a structure under evaluation. Then, a crack detection algorithm is applied to effectively search for cracks or other structural failures based on features that exhibit differential types of motion among the frames of video. The effectiveness of the approach is validated through testing with in-plane and out-of-plane fatigue cracks. Results indicate that the approach described herein can robustly identify fatigue cracks, even when the cracks are under low or even insufficient light conditions, surrounded by other crack-like edges, covered by complex surface textures, or invisible to human eyes due to crack closures. The approach can also be relied upon to accurately quantify the size of cracks with submillimeter accuracy.

Compared with methods based on edge detection in static images, the approach described herein does not rely on edge features of cracks, leading to more robust detection results even when the crack is surrounded by crack-like edges, covered by dust, rust, and corrosion, or visually invisible to human eyes under crack closures. Compared with DIC technologies, the proposed approach is more flexible for field implementation since it does not require expensive equipment, special light sources, or surface treatments. Further, the proposed method enables accurate quantification of the crack opening with a submillimeter accuracy. Such information can be used for fatigue damage assessment and long-term fatigue life prediction. Finally, the approach described herein can be applied to identify the discontinuities in other engineering applications such as detecting localized slippage or loosening of structural components.

Turning to the drawings, FIG. 1 illustrates a representative strategy to implement the computer-vision-based crack detection approach described herein on a structural member through multiple inspection periods, where F is the fatigue load. The proposed crack detection approach can consistently monitor an existing fatigue crack as it propagates over time as well as detect newly-developed fatigue cracks through multiple inspection periods.

As shown in FIG. 1, a girder 10, for example, is initially subjected to a fatigue crack "a" under a fatigue load F. To detect and localize crack "a," a first inspection is performed by deploying an image capture device 20 in front of the girder 10. The distance between the image capture device 20 and the girder 10 can depend on various considerations, such as the camera resolution, the amount of light, the size of the region under evaluation, and other factors. A distance of 15 cm to 25 cm was adopted in the experimental validations described below, but other distances or ranges can be used.

In the first inspection period, multiple short videos #1-#6 are collected by the camera 20 as the girder 10 is under the fatigue load F. Each of the videos #1-#6 can capture a different region of the girder 10, although the regions can overlap at least in part. The length of the short videos can vary, and example lengths include 3 second, 6 second, 12 second, 24 second, or longer videos, although any suitable length can be used. The videos are processed using the computer-vision-based approach described in further detail below. In the example shown, the crack "a" is detected and localized in video #5, while the analysis of the other videos indicates no other cracks.

Fatigue cracks in steel bridges may take years or decades to propagate prior to reaching critical sizes, and repeated inspections on a regular basis are advised to monitor existing cracks and to detect new cracks. In that context, the computer-vision-based crack detection approach described herein can rely on a number of subsequent inspection periods. For example, in the second inspection period, the existing crack "a" has further propagated (e.g., enlarged in size) and the new crack "b" has started as shown in FIG. 1. By repeating the same video acquisition and processing procedures performed in the first inspection period, the new crack "b" and a longer crack "a" can be detected and localized in videos #2 and #5, respectively.

The crack detection approach described herein identifies discontinuities in the displacement field of a structural surface induced by the opening and closing of fatigue cracks through feature tracking. For feature tracking, the lighting conditions and structural surface texture should, ideally, be constant or consistent during the period of the short video. However, the proposed approach does not require the lighting or surface features to remain completely constant over different inspection periods. For example, if the surface texture around crack "a" in the second inspection period due to corrosion, the proposed approach can still identify the same crack "a".

Figure 2:
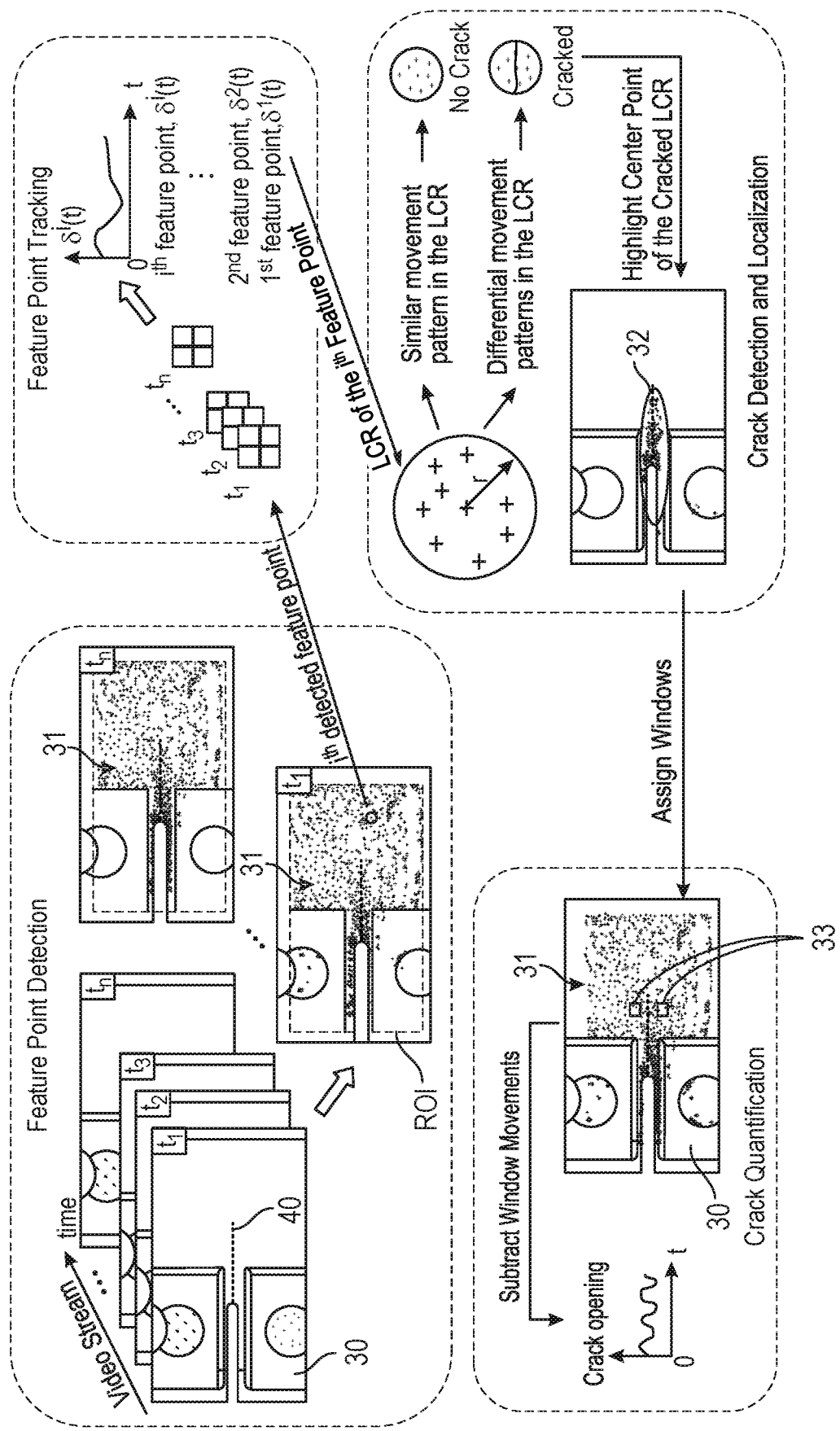
FIG. 2 illustrates a representative example of the computer-vision-based crack detection approach according to various embodiments described herein.

FIG. 2 illustrates a representative example of the computer-vision-based crack detection approach according to various embodiments described herein. The approach relies upon (a) feature point detection, (b) feature point tracking, (c) crack detection and localization, and (d) crack quantification and qualification. In FIG. 2, $t_1$, $t_2$, $t_3$ . . . $t_n$ are representative of different frames in a video, ROI is the region of interest, $\delta(t)$ is the movement of a feature point, LCR is the localized circular region, and r is the radius of the LCR in terms of the number of pixels in the frame of the video.

In FIG. 2, a video which contains an existing fatigue crack (e.g., similar to video stream #5 in FIG. 1) in a structure 30 under test is used as an example to illustrate the proposed approach. First, during feature point detection, a number of feature points 31 are detected within an ROI of each frame of the video. The feature points 31 are shown as individual dots or markers in FIG. 2. The manner in which the feature points 31 are detected is described in further detail below.

Next, in feature point tracking, the movement $\delta^i(t)$ of one or more of the individual feature points i among the feature points 31 are tracked over multiple frames $t_1$, $t_2$, $t_3$ . . . $t_n$ of the video. Based on the movements of the feature points 31, crack detection and localization are performed later. The approach evaluates the movement pattern of each feature point i against a number of the feature points 31 adjacent to it, within an LCR. The LCR of a particular feature point i can be defined to include all the feature points 31 within a certain radial distance r from the particular feature point i. The radial distance r can be determined based on various factors such as processing capability and time constraints among other factors.

In crack detection and localization, if all the feature points 31 share a similar movement pattern within the LCR, the movement of the LCR is considered to exhibit rigid-body motion, indicating no crack within the LCR. On the other hand, if differential movement patterns are found, the feature point i at the center of the LCR is identified or highlighted as a crack may exist in the LCR. By moving the LCR across at least a subset of the feature points 31 in the ROI and repeating the procedure, all the particular feature points i at the centers of the LCRs that exhibit differential movement patterns can be highlighted. In FIG. 2, a collection of highlighted feature points 32 indicates the location of a crack 40 in the structure 30.

Finally, in crack quantification and qualification, a pair of windows 33 is deployed along both sides of the crack 40 and the differential movements of these two windows 33 perpendicular to the crack 40 can be used to quantify the crack 40. For example, the size, shape, length and other characteristics of the crack 40 can be determined. On the other hand, if the video does not contain any cracks (e.g. video #4 in FIG. 1), no feature points would be highlighted after applying the crack detection and localization algorithm.

Example ways to implement feature point detection, feature point tracking, crack detection and localization, and crack opening quantification and qualification are described in further detail below.

Figure 3:
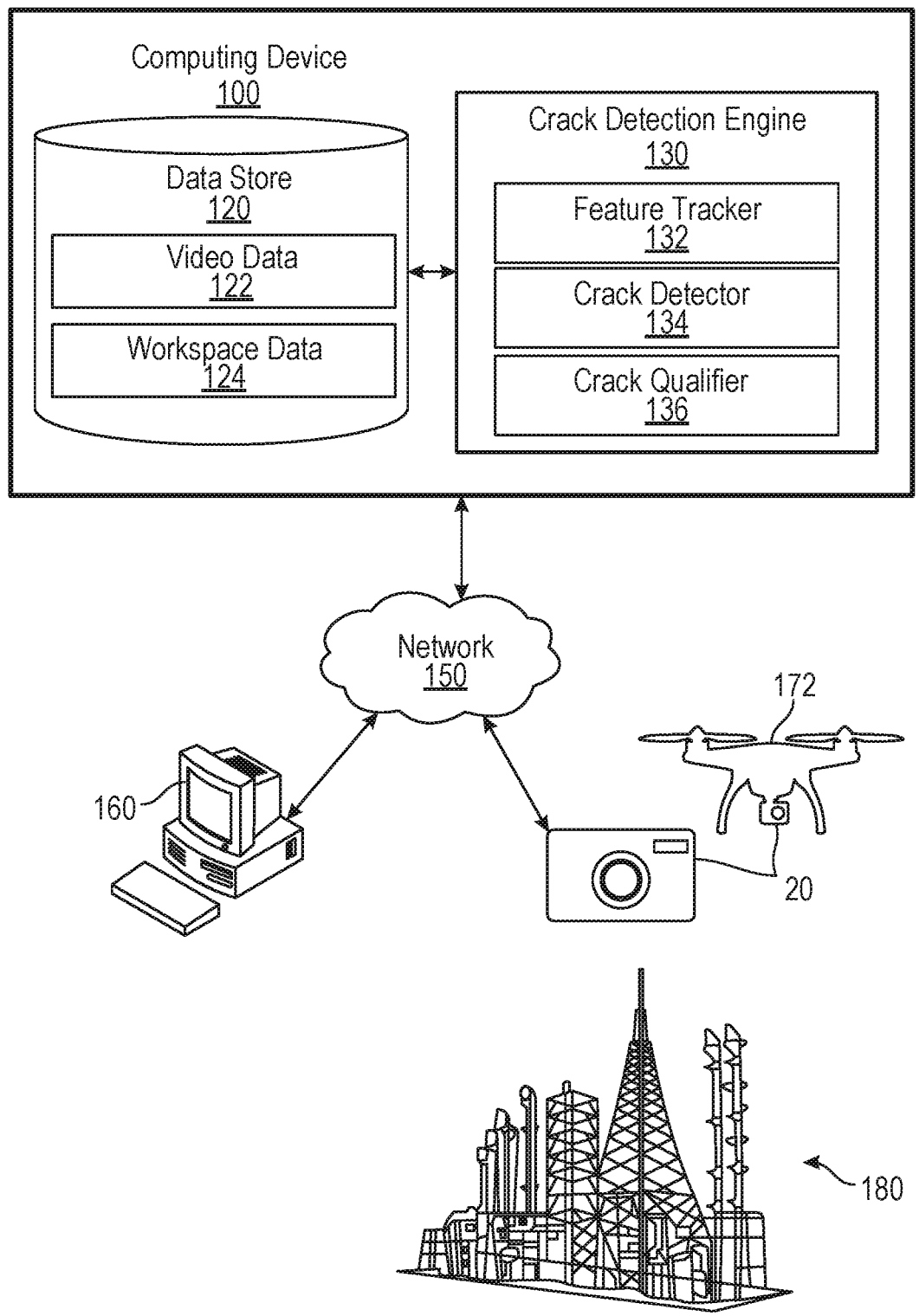
FIG. 3 illustrates an example computing environment for computer-vision-based crack detection according to various embodiments described herein.

FIG. 3 illustrates a computing environment for computer-vision-based crack detection according to various embodiments described herein. The computing environment is provided as a representative example of one environment for computer-vision-based crack detection, but other components can perform the functions described below. The computing environment includes a computing device 100, a network 150, one or more client devices 160, and one or more image capture devices 20. As shown in FIG. 3, the image capture devices 20 are positioned to capture a sequence of images (e.g., a video) of civil infrastructure 180, such as buildings, roads, bridges, towers, etc., for the purpose of computer-vision-based fatigue crack detection as described herein.

The computing device 100 can be embodied as one or more desktop or server computers, computing devices, or computing systems. In certain embodiments, the computing device 100 can include one or more computing devices arranged, for example, in one or more server or computer banks. The computing device 100 can be located at a single installation site or distributed among different geographical locations. The computing device 100 can include a plurality of computing devices that together embody a hosted computing resource, a grid computing resource, or other distributed computing arrangement. In some cases, the computing device 100 can be embodied as an elastic computing resource where an allotted capacity of processing, network, storage, or other computing-related resources varies over time. As further described below, the computing device 100 can also be embodied, in part, as certain functional or logical (e.g., computer-readable instruction) elements or modules as described herein.

Among other components, the computing device 100 includes a data store 120 and a crack detection engine 130. The data store 120 includes an area in memory for the storage of video data 122 and for the storage of workspace data 124. The video data 122 can include one or more sequences of images or videos of the civil infrastructure 180, which is under analysis by the crack detection engine 130. The video data 122 can include videos of any length, captured at any suitable frame rate and resolution by any suitable imaging device or camera, including the image capture devices 20. The workspace data 124 includes a scratchpad or working memory area for the crack detection engine 130. As examples, the crack detection engine 130 can store data related to one or more ROIs, feature points, the movement or displacement of feature points in the video data 122, and other data for processing.

The crack detection engine 130 includes a feature tracker 132, a crack detector 134, and a crack qualifier 136. As described in further detail below, the feature tracker 132 is configured to detect a number of feature points i within an ROI of multiple frames $t_1, t_2, t_3 \ldots t_n$ of a video under analysis. The feature tracker 132 can store data related to the feature points i as the workspace data 124. The feature tracker 132 is also configured to track the movement $\delta^i(t)$ of one or more of the feature points i over one or more frames $t_1, t_2, t_3 \ldots t_n$ of the video. The feature tracker 132 can evaluate the movement pattern of individual ones of the feature points i against other feature points adjacent to it, within an LCR. The LCR of a particular feature point i can be defined to include the feature points within a certain radial distance r from the particular feature point i. The feature tracker 132 can determine the radial distance r based on various factors, such as processing capability and time constraints, among other factors. Additional operational aspects of the feature tracker 132 are described below.

The crack detector 134 is configured to review the data stored in the workspace data 124 to perform crack detection and localization. For example, if the crack detector 134 determines that all the feature points i share a similar movement pattern within an LCR, then the crack detector 134 can identify the movement within the LCR as rigid-body motion. This rigid-body motion is an indicator that no crack exists within the LCR. On the other hand, if the crack detector 134 determines that differential movement patterns are found within the LCR, then the crack detector 134 can identify that a crack may exist in the LCR. The crack detector 134 is configured to move the LCR across at least a subset of the feature points i in the ROI and repeat the procedure. The crack detector 134 can identify and highlight all the feature points i at the centers of LCRs exhibiting differential movement patterns. The crack detector 134 also stores data related to the feature points i at the centers of LCRs exhibiting differential movement patterns in as part of the workspace data 124. Additional operational aspects of the crack detector 134 are described below.

The crack qualifier 136 is configured to quantify and qualify the crack-related data stored in the workspace data 124. As one example, the crack qualifier 136 can use a pair of windows along the sides or edges of a crack identified by the feature tracker 132. The crack qualifier 136 can analyze the differential movements of these two windows, perpendicular to the crack, to quantify the crack. The crack qualifier 136 can analyze the differential movements to determine the size, shape, length and other characteristics of the crack. Additional operational aspects of the crack qualifier 136 are described below.

The network 150 can include the Internet, intranets, extranets, wide area networks (WANs), local area networks (LANs), wired networks, wireless networks, cable networks, satellite networks, other suitable networks, or any combinations thereof. As one example of the network 150, the computing device 100, the client devices 160, and the image capture devices 20 can be communicatively coupled to one or more public or private LANs or WANs and, in turn, to the Internet for communication of data among each other. Although not shown in FIG. 3, the network 150 can also include communicative connections to any number and type of network hosts or devices, such as website servers, file servers, cloud computing resources, databases, data stores, or any other network or computing architectures.

The client devices 160 are representative of one or more client devices. The client devices 160 can be embodied as any computing devices, processing circuits, or processor based devices or systems, including those in the form of desktop computers, laptop computers, tablet computers, personal digital assistants, cellular telephones, or wearable computing devices, among other example computing devices and systems. Depending upon its primary purpose or function, for example, the client devices 160 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 160.

Any of the client devices 160 can be relied upon to interface with the computing device 100. The client devices 160 can interface with the computing device 100 to review the analysis performed by the crack detection engine 130 and the data stored in the data store 120. In some cases, the data store 120 and the crack detection engine 130 can be implemented in one of the client devices 160, and the computing device 100 can be omitted.

The image capture devices 20 can be embodied as one or more image or video cameras capable of capturing a sequence of images at any suitable frame rate and resolution. The image capture devices 20 can be professional- or commercial-grade devices including one or more image sensors, lenses, image processors, memory devices, illumination sources, and other components. The image capture devices 20 can be standalone image capture devices or incorporated into other devices, such as image capture devices in cellular telephones, laptops, media players, and other devices. Videos captured by the image capture devices 20 can be transferred to the computing device 100 over the network 150, using a local wired connection, by hand transfer using a memory stick or device (e.g., a flash-based memory stick or card), or any other suitable means or method.

The image capture devices 20 can be mounted to one or more frames or stands, such as monopods, bipods, tripods, or other stands, and directed (i.e., pointed) to capture videos of the civil infrastructure 180. The image capture devices 20 can be mounted to the civil infrastructure 180 itself or separated from the civil infrastructure 180 by some distance. The distance between the image capture devices 20 and the civil infrastructure 180 can vary based on certain factors, such as the resolution of the image sensors in the image capture devices 20, the focal length of any lenses of the image capture devices 20, the amount of available light, and other factors. In some cases, a number of the image capture devices 20 can be used together to capture videos of different regions or areas of the civil infrastructure 180 for analysis. Additionally, one or more of the image capture devices 20 can be mounted to unmanned aerial vehicles (UAVs), such as the UAV 172. UAVs can be relied upon to position the image capture devices 20 for additional flexibility in capturing videos of the civil infrastructure 180 at hard-to-reach locations or locations obscured from view from the ground. In some cases, the crack detection engine 130 can conduct additional processing steps, as described below, on videos captured by the image capture devices 20 mounted to UAVs.

FIGS. 4A-4D illustrate aspects of feature point detection that can be performed by the feature tracker 132 according to various embodiments described herein. Feature point detection can be relied upon to automatically extract feature points from a structure being monitored without the need to use physical targets or surface treatments. Combined with feature tracking techniques, feature point detection has been applied for solving many engineering problems including vehicle tracking, image mosaicing, 3D reconstruction, object recognition, and other problems.

Algorithms for feature point detection have been proposed by researchers in computer vision. Among other feature point detection algorithms that can be used in the embodiments, several well-known algorithms include: Harris-Stephens (Harris and Stephens, 1998), Shi-Tomasi (Shi, 1994), speeded up robust features (SURF) (Bay et al., 2006), features from accelerated segment test (FAST) (Rosten and Drummond, 2005), scale invariant feature transform (SIFT) (Lowe, 2004), and so forth. The feature tracker 132 can implement any of the above-identified algorithms, variations thereof, and others. The Shi-Tomasi algorithm was relied upon for the examples described herein, although other feature point detection algorithms can also be used.

Figure 4A:
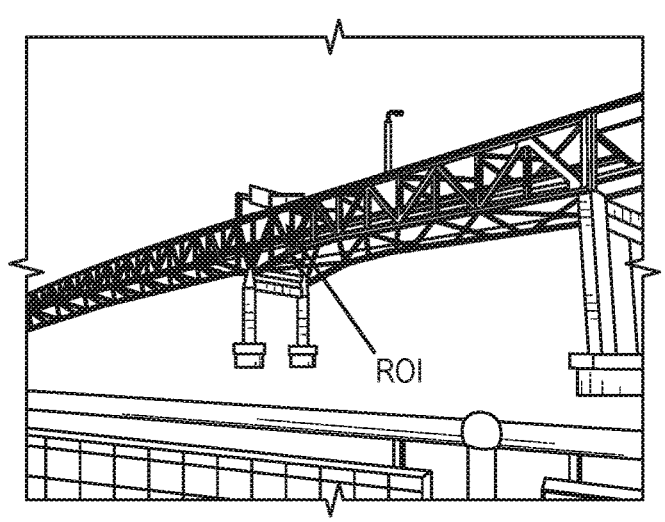
FIGS. 4A-4D illustrate aspects of feature point detection according to various embodiments described herein.
Figure 4B:
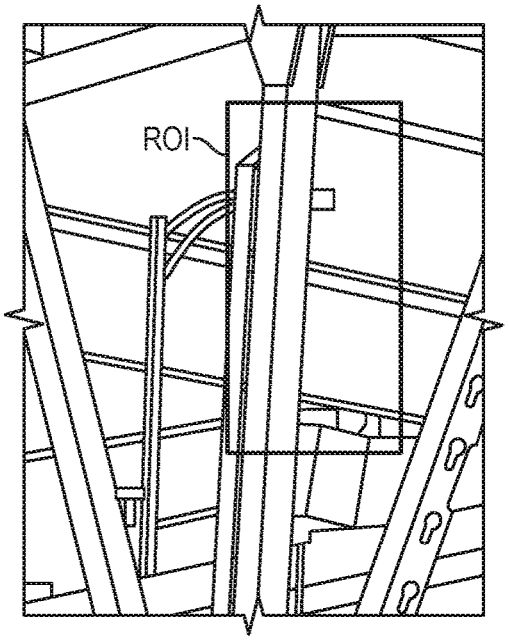
Figure 4C:
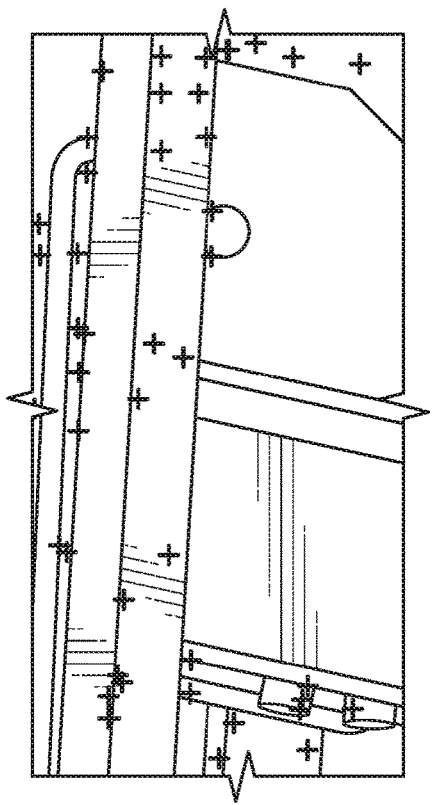
Figure 4D:
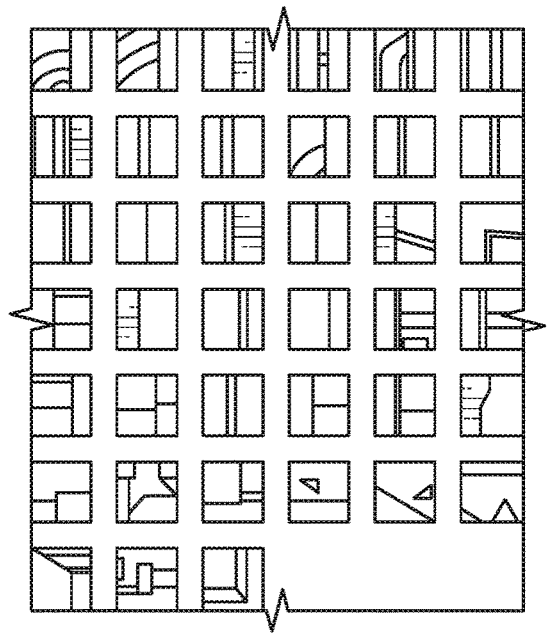

FIG. 4A illustrates a representative drawing of an image of a highway bridge, with ROI, taken by the image capture device 20 with a resolution of 3264 pixels×2448 pixels. FIG. 4B illustrates a drawing of the ROI shown in FIG. 4A. FIG. 4C illustrates feature points detected by the Shi-Tomasi algorithm within the ROI. FIG. 4D illustrates representative examples of the feature points in FIG. 4C, visualized as 11 pixels×11 pixels patches. The ROI can be the entire frame or a subset region of the frame, depending on the availability of prior knowledge about the approximate location of fatigue cracks.

Once the ROI is selected, Shi-Tomasi (Shi, 1994) feature point detection can be applied by the feature tracker 132 to detect the feature points within the ROI. For example, suppose I(x, y) is an intensity 2D image, $I_x$ and $I_y$ are image intensity derivatives (i.e., gradient changes) in horizontal and vertical directions, respectively, $\lambda_1$ and $\lambda_2$ are the eigenvalues of matrix M within a Gaussian window function w(x, y), and:

$$M = \sum_{x,y} w(x, y) \begin{bmatrix} I_x I_x & I_x I_y \\ I_x I_y & I_y I_y \end{bmatrix}. \quad (1)$$

Here, the feature tracker 132 can identify a feature point if λ1 and λ2 satisfy the following criteria:

$$R = \min\{\lambda_1, \lambda_2\} > \text{cutoff threshold} = q \times R_{max} \quad (2)$$

The cutoff threshold controls the quality of the detected feature points. In practice, the cutoff threshold can be dependent on the overall intensities and can change under different scenes. To facilitate practical implementation, the feature tracker 132 can introduce a normalized parameter q in Equation 2, representing the ratio between the cutoff threshold and $R_{max}$, where $R_{max}$ is the highest feature quality value of all feature points in the ROI. A higher value of q leads to more stringent criteria and less detected feature points, and vice versa. A value of q=0.01 was selected in the examples described herein, which produced satisfactory results of feature point detection.

To demonstrate how the Shi-Tomasi algorithm works, FIG. 4A illustrates a representative drawing of an image of a highway bridge taken by an image capture device 20 in a cellular telephone with a resolution of 3264 pixels×2448 pixels. The ROI selected in FIG. 4A is shown as a small region in FIG. 4B. The feature tracker 132 can implement the Shi-Tomasi algorithm in the ROI by searching for all the possible feature points in the ROI that satisfy Equation 2. The detected feature points are shown as crosses in FIG. 4C. Example feature points, along with adjacent pixels, are illustrated in FIG. 4D as patches of 11 pixels×11 pixels.

Several unique aspects of feature point detection can be observed in practice. First, feature points can be detected based on the change of intensity gradient in the image, which is an inherent aspect that exists in most images. In this regard, special templates or physical targets commonly required in traditional motion tracking are not needed. Second, feature point detection does not require special lighting conditions or high-end cameras, making it more flexible for engineering applications. Third, a total of 39 feature points were detected in the ROI shown in FIG. 4B, indicating the effectiveness of the detection algorithm.

Once feature points are detected by the feature tracker 132, the feature tracker 132 is configured to track the movement δ(t) of each feature point among a number of frames of video. In one example, the Kanade-Lucas-Tomasi (KLT) tracker (Tomasi and Takeo, 1991; Lucas and Takeo, 1981) can be adopted by the feature tracker 132 for tracking the feature points. To track a particular feature point i between the frames of the video, the feature tracker 132 can apply the KLT to estimate the movement of the feature point i between two adjacent frames within the Gaussian window function w(x, y), so that the Sum of Squared Differences (SSD) of an intensity image I(x, y) is minimized (Sinha et al., 2006). In some cases, the feature tracker 132 can also adopt forward and backward tracking (Kalal et al., 2010) to reliably detect tracking failures based on discrepancies between the forward and backward trajectories for two adjacent frames.

The feature point detection and tracking algorithms performed by the feature tracker 132 are not limited to the Shi-Tomasi and KLT approaches. In addition to the Shi-Tomasi and KLT approaches, other combinations can also be utilized. Examples include the Harris-Stephens features associated with the KLT tracker (Yoon et al., 2016), and the SIFT features associated with the descriptor vectors-based tracker (Khuc and Catbas, 2017). To ensure robust feature tracking results, the lighting conditions and surface textures on the monitored structure would ideally remain constant during the acquisition of the video. Tracking performance may be affected if the lighting conditions change dramatically or if the surface paint peels off, for example, while a video is captured. However, since only relatively short videos (e.g., about 6 seconds) are needed, changes in lighting conditions and surface textures can be assumed to be rare in practice.

Thus, the feature tracker 132 can combine feature detection (e.g., Shi-Tomasi or other algorithm) and flow motion tracking (e.g., the KLT or other algorithm) algorithms. The feature tracker 132 can apply the flow motion tracking to only a subset of pixels associated with detected feature points and, thus, implements sparse motion tracking. There are two advantages of performing sparse motion tracking as compared to conducting motion tracking to all pixels in a video. First, sparse motion tracking tracks only reliable feature points, so the result is more robust. Second, sparse motion tracking reduces the amount of computation required to increase the efficiency of the algorithm.

The feature detection and motion tracking examples described above assume that the image capture devices 20 are fixed during video acquisition. In another embodiment, the feature tracker 132 can perform feature detection and motion tracking with videos captured by image capture devices 20 that move during video acquisition. The ability to use videos captured by image capture devices 20 that move extends the flexibility and applicability of the computer-vision-based crack detection approach described herein to other real-word applications.

When the image capture devices 20 are handheld or carried by the UAV 172, the videos captured by the image capture devices 20 can exhibit translational and rotational movement among frames. Such movement can cause geometric distortions to features in the frames of the videos, which introduce errors to the tracked surface motion and the crack detection result. Thus, the feature tracker 132 can perform geometric transformation processing steps to account and compensate for the distortion caused by camera motion.

To compensate for geometric distortions, the feature tracker 132 is configured to first detect the feature points i at each frame in a video as described above. The feature tracker 132 then calculates geometric transformation matrixes between an initial frame $t_1$ and subsequent frames $t_2, t_3 \ldots t_n$. With the estimated transformation matrices, the subsequent frames $t_2, t_3 \ldots t_n$ can be registered or recreated as new frames sharing the same coordinate system with the initial frame $t_1$.

The feature tracker 132 is then configured to analyze the movement patterns of the feature points i by computing two variables including the relative movement $\delta^i(t)$ of the feature points i from the initial frame $t_1$, and the relative angle change $\theta^i(t)$ of the feature points from the initial frame initial frame $t_1$. $\delta^i(t)$ and $\theta^i(t)$ describe the magnitude and orientation of the movement of each feature point i. The crack detector 134 can then establish a crack detection and localization algorithm by evaluating $\delta^i(t)$ and $\theta^i(t)$ for all feature points within an LCR as described below.

The crack detector 134 is configured to perform crack detection and localization processes. The crack detector 134 can efficiently and robustly identify discontinuities in surface motion on structural components between frames of a video. Identifying such discontinuities from the feature point movements can be challenging because the movement of cracks, such as opening and closing under load forces, is usually very small and can be hidden or obscured in the larger global rigid-body movement of the monitored structure. To tackle this problem, the crack detector 134 is configured to first denote x and y as horizontal and vertical coordinates of a 2D image, denote $x^i(t)$ and $y^i(t)$ as two vectors containing the coordinates of a particular feature point i at frame t, and denote FP as the total number of feature points in an ROI. The relative movements of feature point i between the $t^{th}$ frame and the initial frame can then be expressed as:

$$x_r^i(t) = x^i(t) - x^i(1) \text{ and } y_r^i(t) = y^i(t) - y^i(1). \quad (3)$$

In Equation (3), subscript r represents relative movement, and $x^i(1)$ and $y^i(1)$ are the coordinates of feature point i at the initial frame of the video. Subsequently, the total movement or displacement of feature point i, combining both the $x_r^i(t)$ and $y_r^i(t)$ components, can be expressed as:

$$\delta^i(t) = \sqrt{x_r^i(t)^2 + y_r^i(t)^2}. \quad (4)$$

Figure 5:
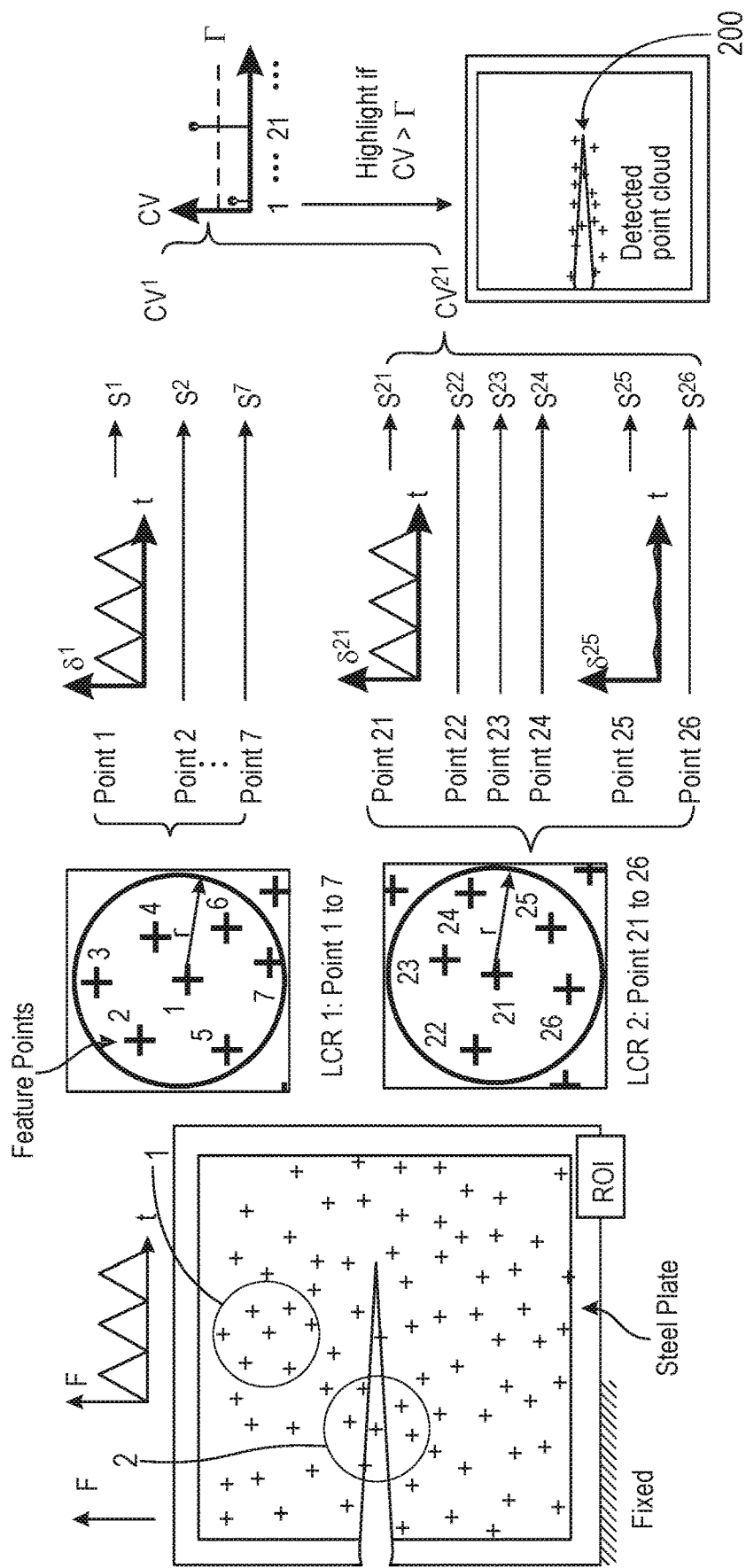
FIG. 5 illustrates an example of the crack detection and localization algorithm according to various embodiments described herein.

FIG. 5 illustrates an example of the crack detection and localization algorithm performed by the crack detector 134 according to various embodiments described herein. In FIG. 5, F is the applied fatigue load, ROI is the region of interest, LCR is the localized circular region, r is the radius of the LCR, δ(t) is the movement of a feature point, S is the standard deviation of δ(t), $CV^1$ is the coefficient of variation of $S^1$ to $S^7$, $CV^{21}$ is the coefficient of variation of $S^{21}$ to $S^{26}$, and F is the predefined threshold.

To efficiently identify the movement pattern of a structural surface, the standard deviation $S^i$ of $\delta_i(t)$ can be relied upon as it provides a robust single-valued metric to quantify the magnitude of movement under repetitive loads. In a similar manner, the standard deviations of all feature points within the ROI can be computed as $S^1, S^2, \ldots, S^i$. Then, an LCR is defined for each particular feature point i, which is at the center of the LCR. The movement pattern of all feature points within the LCR is evaluated by computing the coefficient of variation $CV^i$ of the standard deviations $S^1$, $S^2, \ldots, S^i$ of these feature points located in the LCR at the initial frame.

If $CV^i$ is smaller than a predefined threshold $\Gamma$, as is the case for the feature points within LCR 1 shown in FIG. 5, then the crack detector 134 determines that all the feature points in the LCR have the same movement pattern (i.e., rigid-body movement). On the other hand, if $CV^i$ exceeds the threshold $\Gamma$, as is the case for the feature points 21-26 within LCR 2 shown in FIG. 5, then the crack detector 134 determines that differential movement patterns have occurred in the LCR, indicating the existence of a crack within the LCR.

Finally, the crack detector 134 can repeat this procedure for all feature points in the ROI to obtain a vector of coefficient of variation CV. The crack detector 134 can highlight the feature points at the centers of the LCRs with $CV^i$ larger than the threshold $\Gamma$. The collection of these highlighted feature points represents a detected point cloud 200. The detected point cloud 200 surrounds a path of the crack, and the crack detector 134 can perform further processing on the detected point cloud 200 to determine the path of a detected crack. Because the LCRs are defined based on the locations of feature points in the initial frame, the computation of $CV^i$ is not affected even though some feature points may move outside of the LCR in later frames. When the image capture devices 20 are hand-held or carried by the UAV 172, the crack detector 134 can identify LCRs with differential movement patterns by evaluating $\delta^i(t)$ and $\theta^i(t)$, and the center feature points of those LCRs are highlighted.

FIG. 5 illustrates the crack detection and localization algorithm using a steel plate with an existing fatigue crack as an example. In the example, a repetitive load F is applied at the top of the plate while the bottom of the plate is fixed. The feature points have been detected in the ROI by the feature tracker 132 using Shi-Tomasi algorithm, and two LCRs are selected for evaluation. LCR 1 contains 7 feature points identified as points 1 to 7. Because LCR 1 is away from the crack in the steel plate, it is subjected to a rigid-body movement under F. The movements of all 7 feature points $\delta^1(t)$ to $\delta^7(t)$ follow a similar pattern under the applied fatigue load F. The standard deviations $S^1$ to $S^7$ of feature point movements $\delta^1(t)$ to $\delta^7(t)$ in LCR 1 have similar magnitudes, leading to a small coefficient of variation, denoted as $CV^1$, where the superscript of $CV^1$ is attributed or associated to the central feature point of LCR 1.

In contrast, LCR 2 contains 6 feature points identified as points 21 to 26. Points 21 to 26 exhibit two distinct movement patterns. The 4 points above the crack (i.e., points 21 to 24) all exhibit a similar movement pattern, while points 25 and 26 below the crack have a much smaller response because of the fixed boundary condition. Those distinct movement patterns in LCR 2 lead to a higher coefficient of variation, denoted as $CV^{21}$, where the superscript of $CV^{21}$ is the label of the central feature point of LCR 2. The higher coefficient of variation is an indicator to the crack detector 134 that a discontinuity exists in LCR 2 and, hence, a crack exists in LCR 2.

The crack detector 134 can tune or vary the radius r of each LCR and the threshold $\Gamma$ in some cases to achieve suitable crack detection results as described below. In addition, due to the intrinsic nature of the proposed crack detection and localization algorithm (e.g., based on detection of discontinuities in the movement patterns of structural surfaces), discontinuities caused by other events in the video can be detected. Examples include slippage or relative rotations between structural components and movement around gaps that exist in the structures being monitored.

A crack opening can be identified by the crack qualifier 136 based on the peak-to-peak amplitude of crack movement caused by fatigue load cycles, which is an important characteristic for evaluating fatigue cracks. The peak-to-peak amplitude of crack movement directly relates to the stiffness reduction of the crack-prone region. Quantifying such crack openings is important for compliance calculations and fatigue life predictions. Traditional crack opening measurement methods (e.g., clip-on gauges, back face strain gauges, push rod gauges, potential drops, ultrasonic methods, and other instrumentation) require a significant amount of work to install the instrumentation. In contrast to those means, the crack qualifier 136 can provide a cost-effective approach for quantifying crack openings using computer vision-based feature tracking.

In addition to identifying cracks, the crack qualifier 136 can quantify and qualify certain metrics related to cracks, such as the size and length of the cracks. FIG. 2 illustrates an example approach to quantify a crack. This approach mimics, to some extent, the measurement principle of a clip-on gauge. According to the example shown in FIG. 2, a crack 40 is first detected by the crack detector 134 using the detection and localization algorithm described above. Based on the location of the crack 40, a pair of windows 33 are deployed by the crack qualifier 136 along both sides of the path of the crack 40 in an ROI.

The crack qualifier 136 can estimate the movement of each window 33 as the average movement of all feature points within each window 33 using the tracking results obtained by the feature tracker 132 and stored in the workspace data 124. Next, the crack qualifier 136 can obtain the relative movement between the pair of windows 33 by subtracting the movement of the top window 33 from that of the bottom window 33. Using the same process, crack opening measurements at other locations can be achieved by moving or sliding pairs of windows along both sides of the crack 40. The crack qualifier 136 can adjust the number of feature points within each window 33 for accuracy. As one example, the number of feature points within each window 33 can be 5, although smaller or larger numbers of feature points can be encompassed in windows.

A number of experimental tests were performed to validate the vision-based crack detection approach described herein. One experiment was based on a small-scale compact tension ("C(T)") specimen. Compact tension specimens are generally notched samples and are standard specimens in accordance with American Society for Testing and Materials (ASTM) and International Organization for Standardization (ISO) standards. The purpose of such notched samples is to create a fatigue crack by cycling the sample to maximum and minimum loads. The compact tension specimen selected for the experiment was a single edge-notched plate loaded in tension with an in-plane fatigue crack.

Figure 6A:
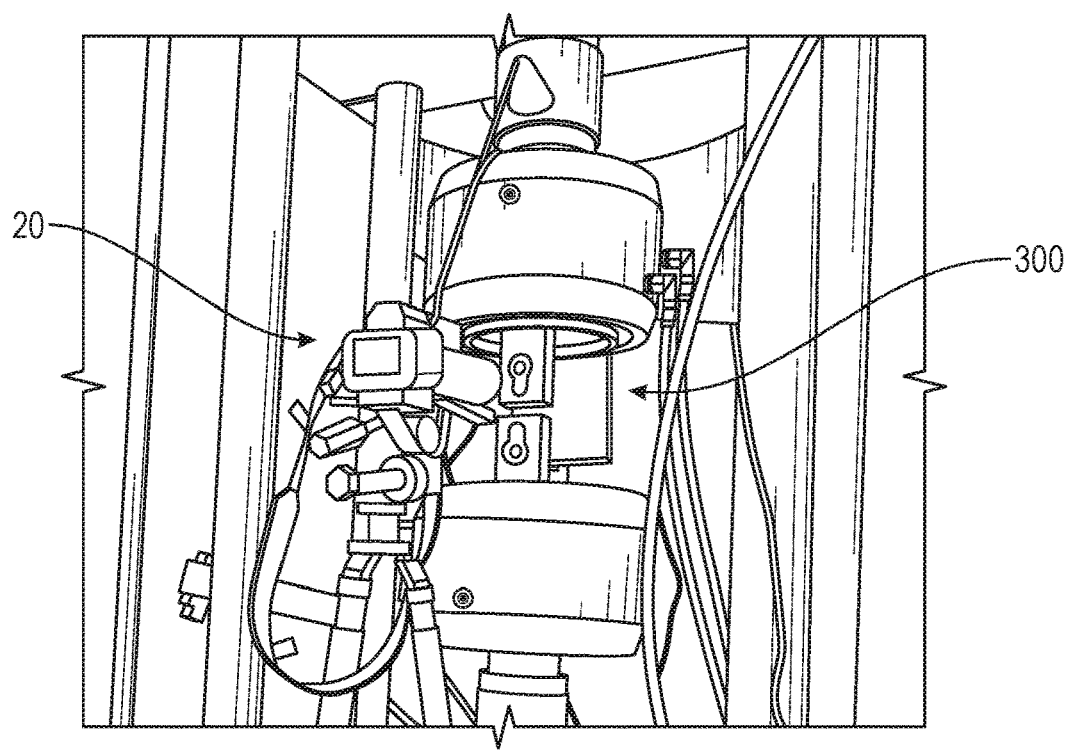
FIGS. 6A and 6B illustrate an example experimental validation test setup according to aspects of the embodiments described herein.
Figure 6B:
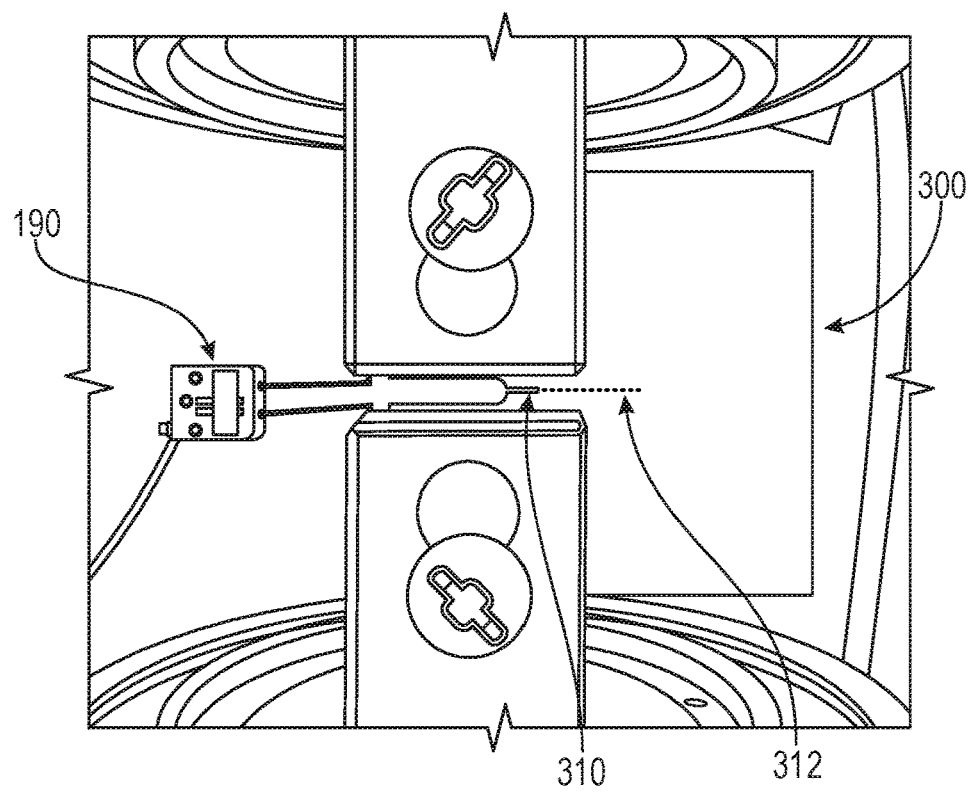

FIGS. 6A and 6B illustrate an example experimental validation test setup. FIG. 6A illustrates an image capture device 20 mounted on a tripod 112 with a C(T) specimen 300 mounted in the experimental validation test setup. FIG. 6B illustrates the installation of a clip-on displacement gauge 190 in the experimental validation test setup. A notch 310 of the specimen 300 is also shown in FIG. 6B, and the C(T) specimen 300 includes a crack 312 that extends some length from the notch 310.

A closed-loop servo-hydraulic uniaxial load frame, as shown in FIG. 6A, served as the fatigue loading system. The ambient lighting condition in the test setup included two ceiling lamps. A distance between the image capture device 20 and the specimen 300 was about 25 cm and the lens of the image capture device 20 was parallel to the surface of the specimen 300. The specimen 300 was an A36 steel plate with a thickness of 6.35 mm. To visually observe the crack 312, the specimen 300 was polished by sandpaper.

The specimen 300 was installed in the loading frame through two devises and rods. At the front face of the specimen 300, the displacement gauge 190 was mounted for accurately measuring the opening of the crack 312, as shown in FIG. 6B. During the test, a periodic fatigue load was applied by the actuator through the bottom clevis while the top clevis was fixed. The crack 312 existed in the specimen 300 at the beginning of the test. A length of the crack 312, as measured from the notch of the specimen 300, was found to be 53.3 mm.

Because the size of the crack 312 in the specimen 300 depends in part on the amplitude of the applied load, it is important to design a realistic loading protocol for validating the computer-vision-based crack detection approach described herein. ASTM E1820-15 (ASTM, 2015) was adopted as a design guide. The range of stress intensity factor $\Delta K$ was determined as 19.8 MPa$\sqrt{m}$, and the stress intensity ratio R was assigned as 0.47. Utilizing these design parameters, $F_{max}$ and $F_{min}$ of the load cycles were computed as 3.0 kN and 6.5 kN, respectively.

During a fatigue test using the experimental validation test setup shown in FIGS. 6A and 6B, a video was taken by the image capture device 20 for the entire loading event. A 6-second video was cut from the including the specimen 300 under the repetitive load. The resolution of the video was 1920 pixels×1080 pixels and the frame rate was 29.97 fps. The video stream was processed by the crack detection engine 130.

Figure 7:
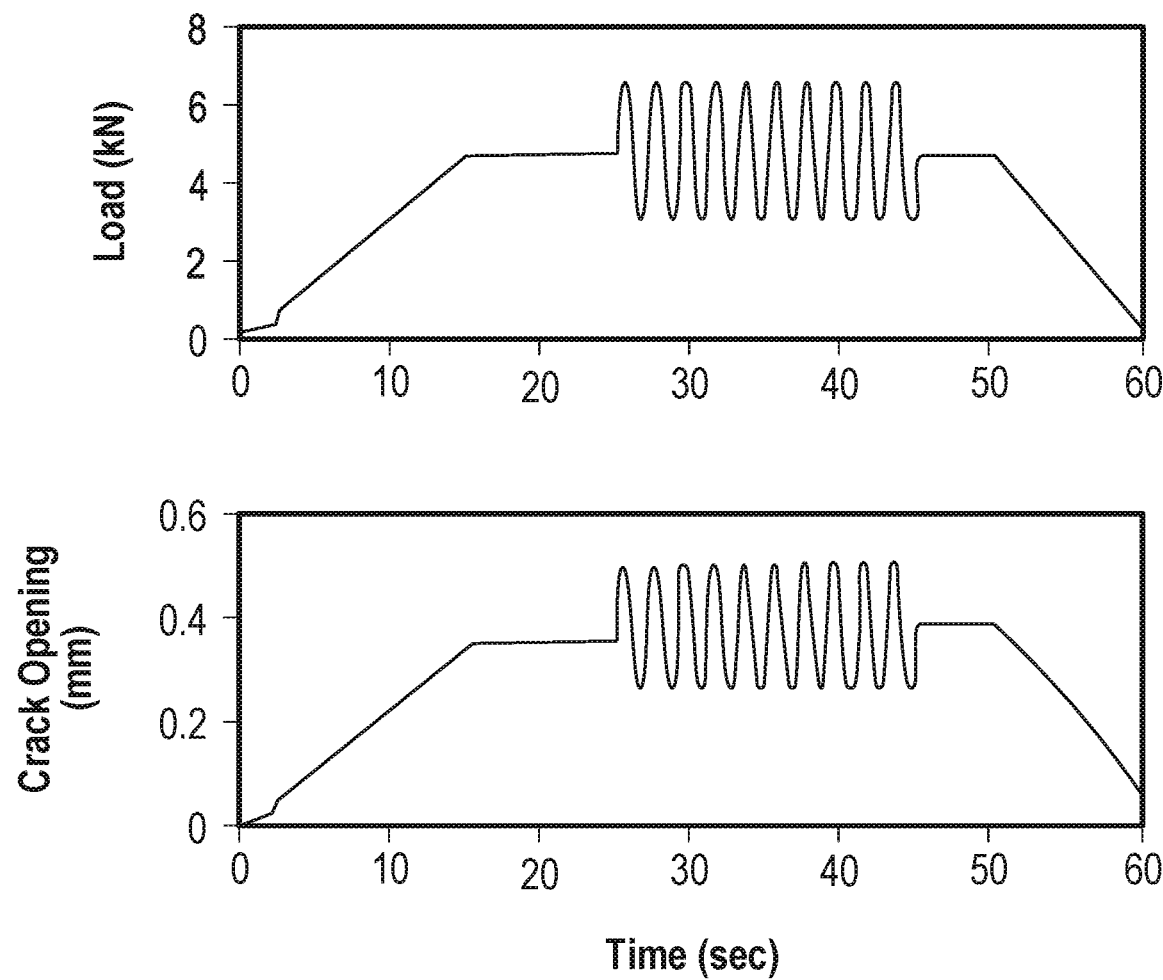
FIG. 7 illustrates characteristics of the crack shown in FIG. 6B under fatigue loading according to aspects of the embodiments described herein.

FIG. 7 illustrates characteristics of the crack 312 in the specimen 300 shown in FIG. 6B under fatigue loading. The graph at the top of FIG. 7 illustrates a loading protocol adopted during the test, and the graph at the bottom illustrates a size of the crack opening of the crack 312, as measured by the displacement gauge 190 at the front face of the specimen 300. As shown in FIG. 7, ten load cycles were applied on the specimen 300. The fatigue loading rate was 0.5 Hz. Under the loading protocol, the peak-to-peak amplitude of the crack opening of the crack 312 was found to be around 0.2 mm, as measured by the displacement gauge 190. Although the crack 312 was difficult to visually identify without load (i.e., when F=0), it was possible to visually identify the crack 312 when F was increased to $F_{mean}=(F_{max}+F_{min})/2=4.75$ kN. When F reached its maximum of 6.5 kN, a slightly larger crack opening could be identified.

Figure 8:
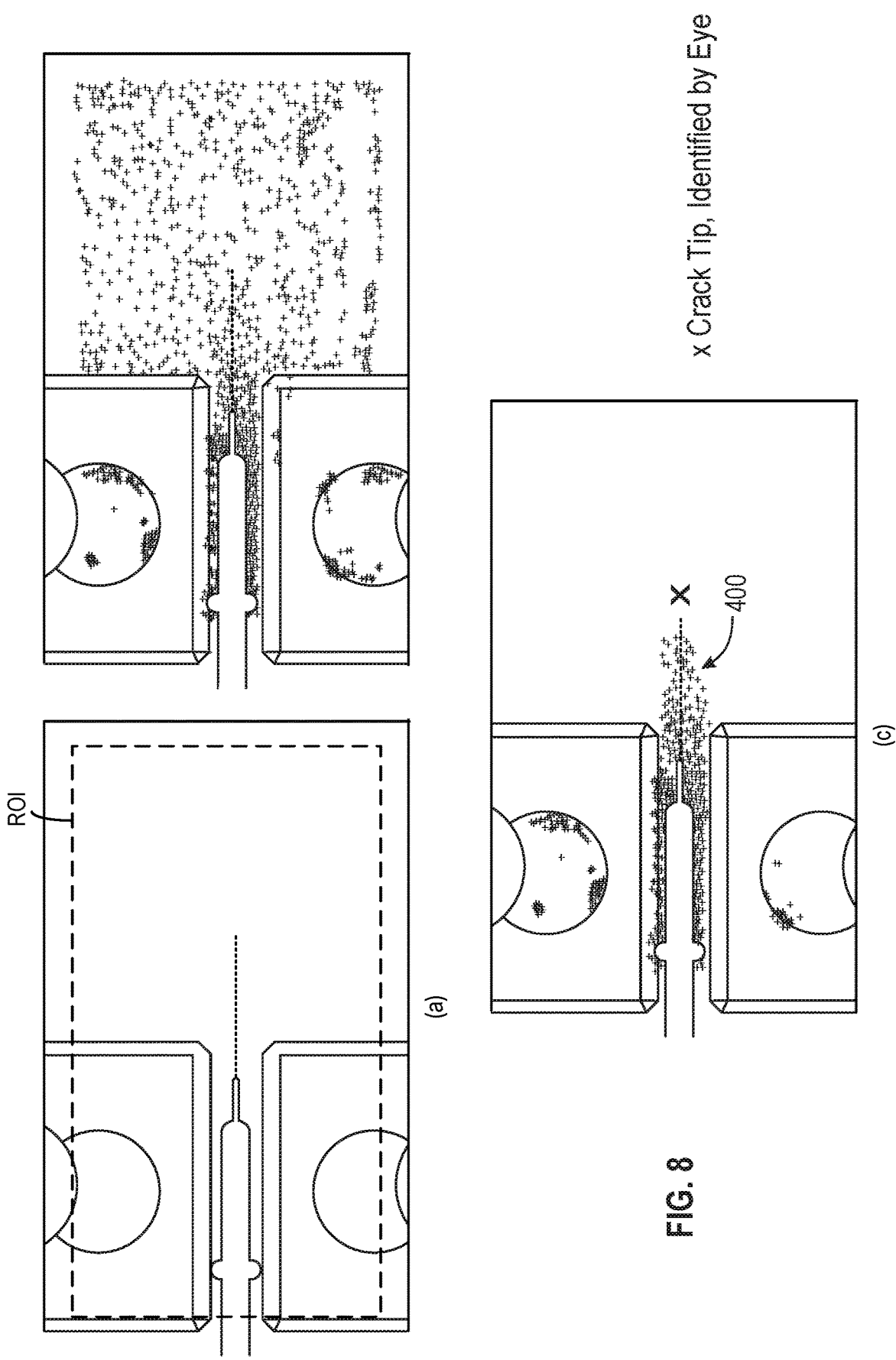
FIG. 8 illustrates a region of interest, detected feature points, and the detection of a crack according to aspects of the embodiments described herein.

FIG. 8 illustrates an ROI, detected feature points, and the detection of a crack. In FIG. 8, (a) illustrates an initial frame of a video where the ROI is shown in a box, (b) illustrates all feature points detected by the feature tracker 132, and (c) shows the result of crack detection performed by the crack detector 134.

In FIG. 8, (a) shows the initial frame and the selected ROI of the 6-second video used during the test. In the ROI, a total of 4043 feature points were detected by the feature tracker 132 as shown in (b). The feature points were evenly distributed over the ROI except regions of the two clevises where less feature points were extracted due to the fact that the camera did not focus on the devises. However, some feature points were still recognized at the tiny gaps between the devises and rods due to higher gradient changes in these localized regions.

In FIG. 8, (c) shows the result of crack detection performed by the crack detector 134 when r=120 pixels and $\Gamma$=0.20, in which r is the radius of the LCR and $\Gamma$ is the threshold coefficient of variation as described above. In (c), a subset of the feature points shown in (b) have been highlighted by the crack detector 134, as a detected point cloud 400, because differential movement patterns were found in the LCRs associated with those feature points. That is, the crack detector 134 identified a discontinuity in the areas surrounding (i.e. in the LCR with a radius of r) the feature points shown in (c). The crack 312 should pass through the detected point cloud 400 shown in (c). One phenomenon from the result is that a few feature points appear at the gaps between the devises and rods, which might be due to the discontinuities caused by the relative rotation between the devises and rods during the test.

Figure 9:
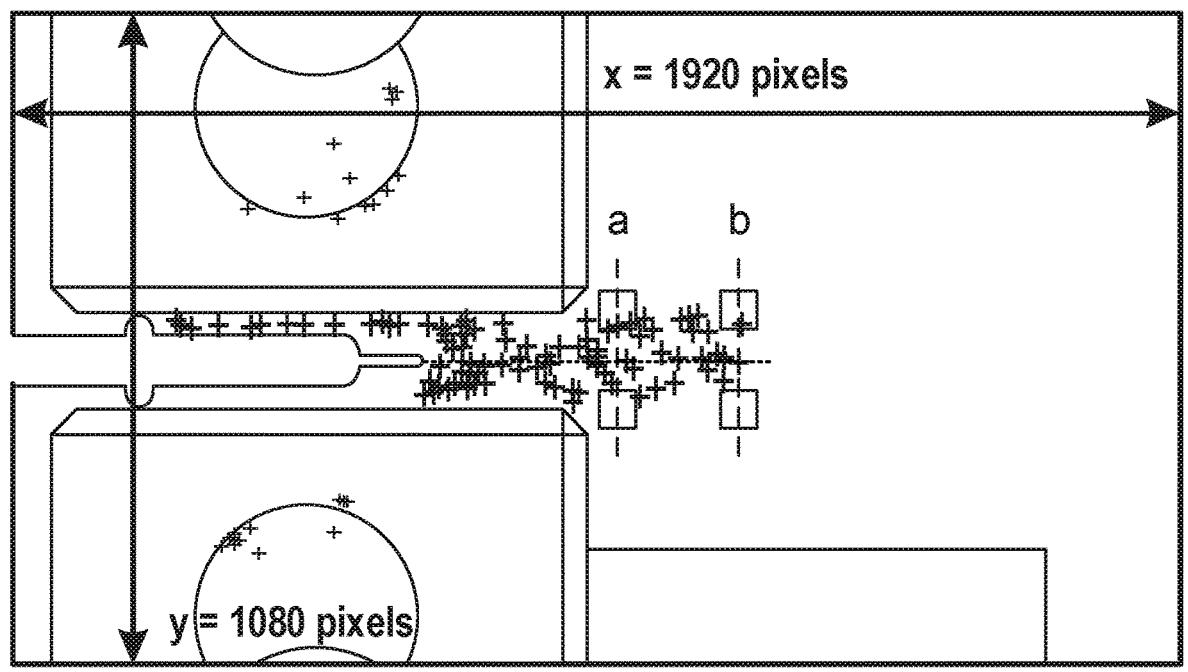
FIG. 9 illustrates a methodology for crack opening measurement or qualification according to aspects of the embodiments described herein.

Once the fatigue crack has been detected and localized as shown in (c) of FIG. 8, the crack opening can be quantified by the crack qualifier 136. For that purpose, the crack qualifier 136 performs operations with two pairs of small windows, each with size of 60 pixels×60 pixels, at locations "a" and "b" along both sides of the path of the crack 312, as shown in FIG. 9.

Figure 10A:
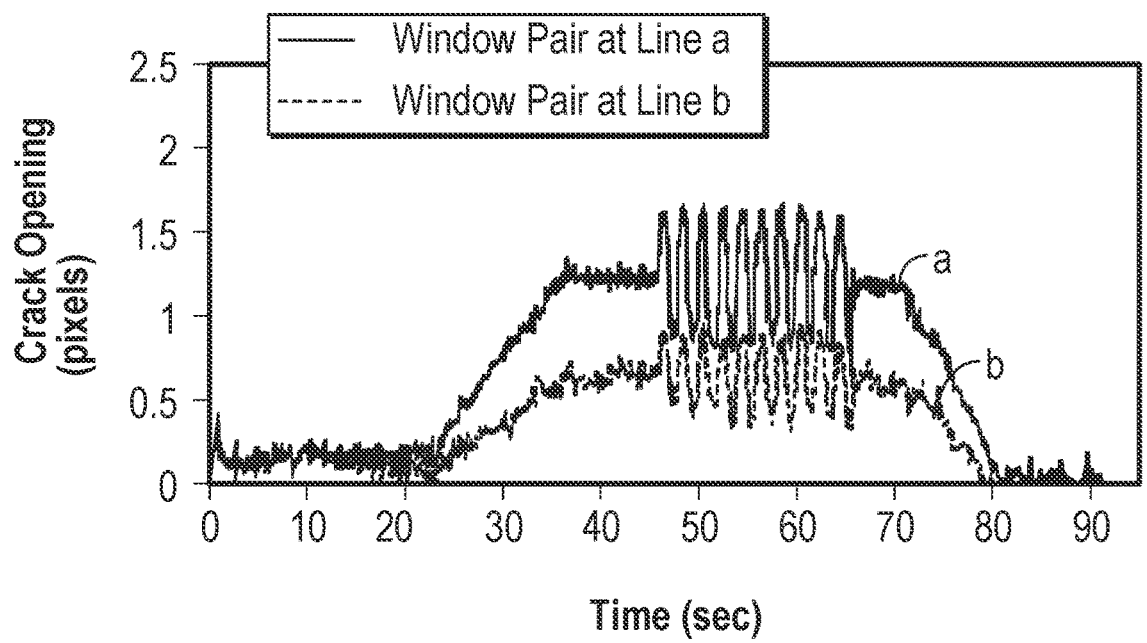
FIG. 10 further illustrates the methodology for crack opening measurement or qualification according to aspects of the embodiments described herein.
Figure 10B:
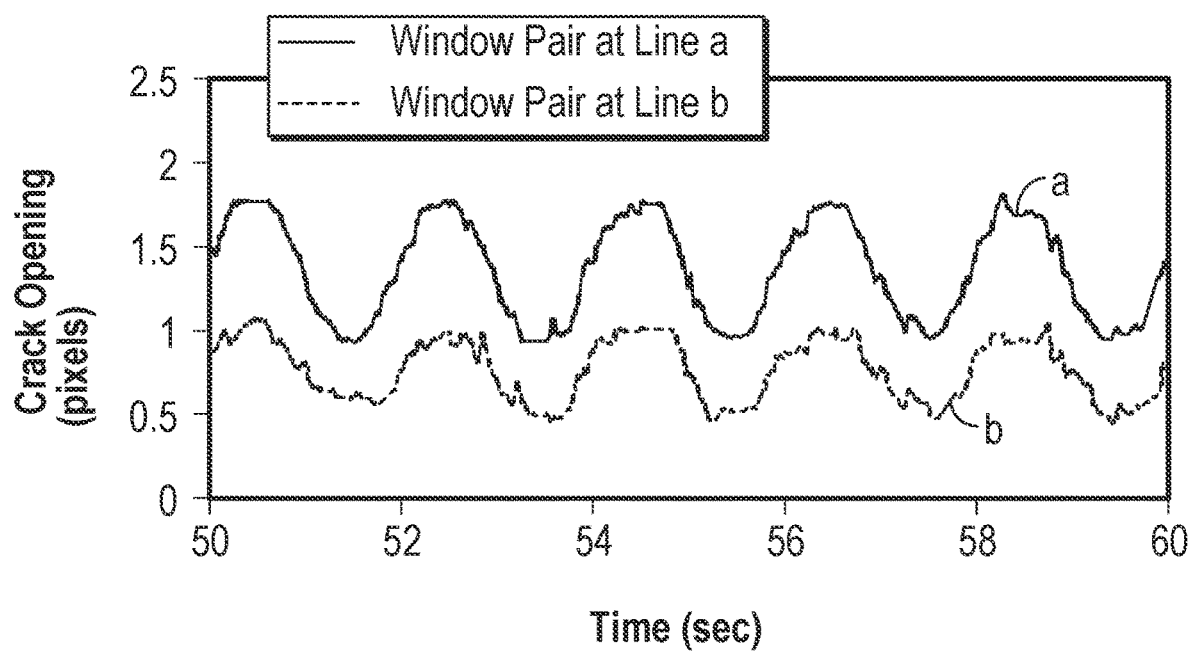

FIG. 10 illustrates the raw measurements of crack openings at location "a" and "b" (y direction in FIG. 9) during the entire loading event of the test. Both measurements show similar responses under the applied load, but the peak-to-peak amplitudes are decreased at the location closer to the crack tip. The crack opening measurements are shown in term of number of pixels. To convert measurements from pixels to units of length (e.g. mm), one approach is using the knowledge about the real world dimensions of the monitored scene. Similar approaches have been adopted by many vision-based motion monitoring approaches. For this particular test, the crack detection engine 130 can use a scaling factor computed based on the distance between the front and back faces of the specimen 300, which is measured as 158.8 mm and 1633 pixels in the video, leading to a scaling factor of 0.0972 mm/pixel. Using this scaling factor, crack opening measurements can be converted to mm by the crack detection engine 130.

Figure 11:
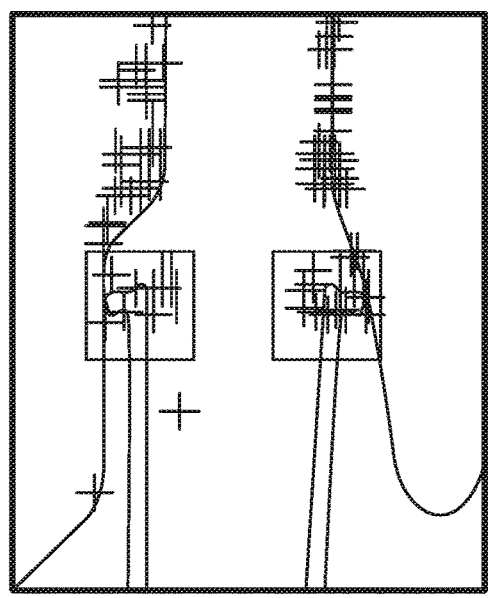
FIG. 11 illustrates a comparison of the measurement of a crack opening using the computer-vision-based approach against actual measurements by a clip-on gauge according to aspects of the embodiments described herein.
Figure 11:
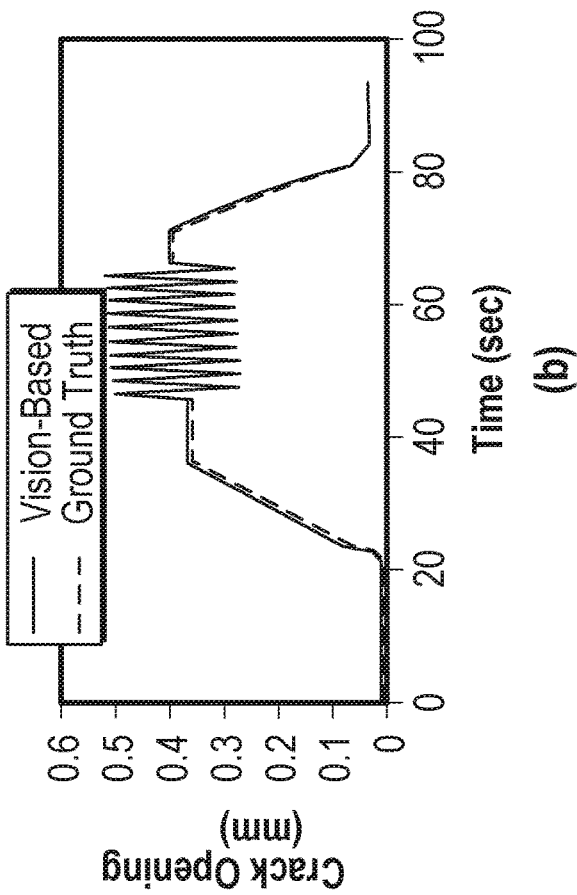
Figure 11:
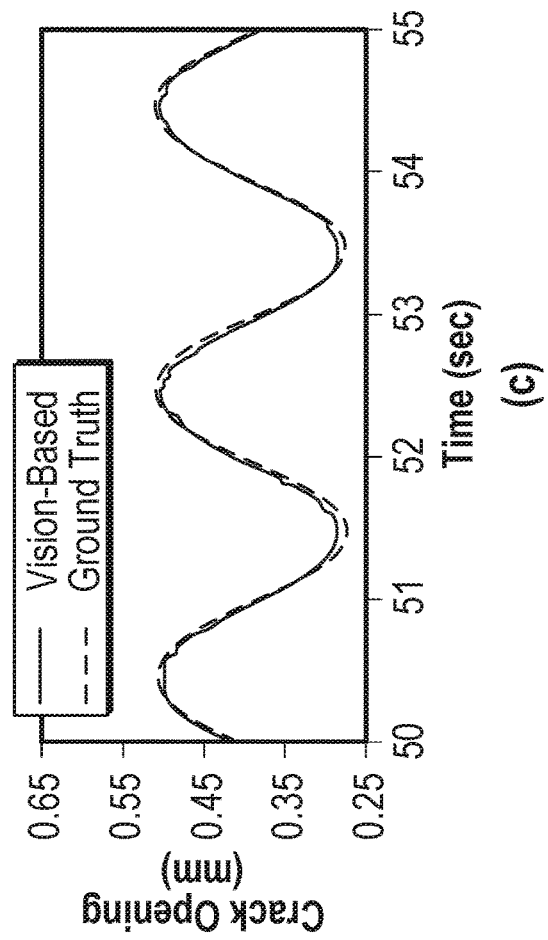

In FIG. 11, (a) illustrates a pair of windows with size of 60 pixels×60 pixels deployed at the front face of the specimen 300, (b) shows a comparison of crack openings at the front face of the specimen 300 using the computer-vision-based approach against the actual measurements by the displacement gauge 190, and (c) shows a detailed view of the measurements between 50 to 55 seconds in the video. The computer-vision-based measurement was taken from the relative movement between a pair of windows at the front face, while the actual measurement was obtained by the displacement gauge 190 mounted at the same location. Good agreement is shown in both (b) and (c) in FIG. 11, indicating the accuracy of the proposed method for quantifying the size of crack openings at the sub-millimeter level.

The proposed crack detection approach can also be applied for out-of-plane fatigue cracks, as was demonstrated based on a test on a skewed girder-to-cross-frame. The purpose of this test was to examine the robustness of the proposed approach on other structural configurations. A skewed girder-to-cross-frame connection was adopted for the test as it is a typical structural connection in many steel highway bridges. In the test, a bottom flange of a steel girder was mounted on the floor, simulating the constraint from the bridge deck. At the mid-span of the girder, a cross frame was connected to the girder web via a stiffener plate. Fillet welds were applied along both sides of the stiffener. Due to the lack of consideration of fatigue resistance, a common issue for such type of bridges designed before 1985 in the United States, the stiffener was only welded to the girder web while the top and bottom of the stiffener were free to move (i.e., a gap existed between the stiffener and the bottom flange. At the far end of the cross frame, a closed-loop servo-hydraulic uniaxial actuator applied fatigue loads in the vertical direction.

Prior to the test, a connection model had been applied with 2.7 million load cycles with a load range of 0 kN to 11.1 kN, causing an out-of-plane fatigue crack along the vertical weld toe between the stiffener and the web. The fatigue crack was about 70 mm in length along only one side of the stiffener (i.e., it did not penetrate the thickness of the stiffener). Results of the test demonstrated the detail of a fatigue crack when the applied load was 0 kN and 11.1 kN, respectively.

Regular ceiling lights were used when the video was taken for the test, and the same image capture device was used as in the tests shown in FIG. 6A. The distance between the lens and the fatigue crack was about 15 cm. The video was taken while repetitive fatigue load cycles (0 kN to 11.1 kN) were applied to the test model at a loading rate of 0.5 Hz. During the fatigue load cycles, a 6-second video was taken. The resolution of the video stream was 1920 pixels× 1080 pixels and the frame rate was 29.97 fps. Then, the video was processed under the proposed crack detection and localization approach described herein.

A total of 3736 feature points were detected by the approach described herein using r=60 pixels and $\Gamma$=0.35, where r is the radius of the LCR and $\Gamma$ is the cut-off coefficient of variation. The out-of-plane fatigue crack was successfully detected as a point cloud of highlighted feature points between the stiffener and the web, which is consistent with the location of the fatigue crack. In addition to the fatigue crack, the detected point cloud also covers the gap region between the stiffener and the web of the girder. This was because the bottom of the stiffener rotated during the test, creating discontinuities in the motion of the scene within its adjacent areas. However, utilizing prior knowledge of the structural configuration, the detected point cloud associated with the gap region could be easily eliminated from the detected point cloud, leaving the true fatigue crack in the result.

The parameters r and $\Gamma$ are relatively important in the proposed method and they affect the crack detection results. Crack detection results were obtained under different r values for the two experimental tests, in which $\Gamma$ is fixed at 0.20 for the in-plane fatigue test and 0.35 for the out-of-plane fatigue test. Increasing the radius r of the LCR resulted in more robust crack detection results since more feature points are contained in each LCR. However, the accurate location of the fatigue crack may be difficult to localize as the highlighted feature points occupy a wider area around to the crack path. On the other hand, a smaller r yielded more accurate crack detection results because it narrows down the location of the fatigue crack by showing less highlighted feature points. However, the detection result may become less robust due to insufficient feature points detected.

Further, increasing r resulted in a more stringent detection criterion as only LCRs with significant differential movement pattern are detected as a crack path, while small discontinuities may be neglected. As a result, less highlighted feature points were obtained and the detected point cloud became shorter. On the other hand, a lower $\Gamma$ resulted in a longer detected length of the point cloud. However, if $\Gamma$ is too small, the detected point cloud may cover a larger area and the accuracy of crack path may decrease since more LCRs can satisfy the less stringent criterion.

Both r and $\Gamma$ affect the performance of the proposed crack detection method by changing the shape features (e.g., length and width) of the detected point cloud. Thus, the crack detection engine 130 can tune these two parameters to achieve optimal crack detection. The results also demonstrate a relative difficulty in accurately identifying the end of the crack tip. This is because the crack opening around the crack tip is extremely small, leading to a small discontinuity in surface motion. Detecting such a small discontinuity may be beyond the resolution limits of some cameras. A detected point cloud can cover the crack tip if a very low cut-off threshold $\Gamma$ is applied, but it also covers some non-cracked regions as well. This is because both the detected non-cracked region and the crack tip have similar levels of differential movements due to noise. Overall, the ranges of r and $\Gamma$ may vary with different applications. Examples of relevant factors include the distance between the lens and the monitored surface, the magnitude of the movement of the monitored structure, and the magnitude of the crack opening, among others.

The proposed approach can also identify the same fatigue crack during multiple inspection periods, even when the surface texture, lighting condition, camera pose, and crack length changes. In another test, the structural surface around a crack was polished by an angle grinder. In addition, the image capture device was deployed at a different relative angle so that the orientation of the crack was skewed. A floor lamp was placed about 2 meters away from the connection model to change the lighting conditions as compared with the previous test. In spite of the change in crack length, surface texture, image capture device pose, and lighting conditions, the same fatigue crack was still be detected. This demonstrates the proposed approach can serve as a long-term fatigue crack monitoring tool.

The proposed approach was also compared against other approaches for in-plane fatigue crack detection. The purpose of the comparison was to highlight the fundamental differences of the proposed approach as compared to edge detection-based methods, as the proposed approach is based on surface motion tracking in video streams and does not rely on edge-like features for detecting cracks. Two edge detection methods, including the Sobel (Sobel and Feldman, 1968) and Canny (Canny, 1986) edge detectors, were selected for comparison for their performance in edge detection. Unlike the proposed method which is based on videos, the Sobel and Canny edge detection methods are based on static images.

Two static images were taken from the recorded videos of the in-plane and out-of-plane fatigue tests, in which the specimens were under the maximum applied load that generates the maximum crack opening. For the in-plane fatigue test, both the Sobel and Canny edge detector methods capture fatigue cracks. However, the true fatigue crack is also surrounded by many crack-like edges including the boundary of devises and the sticky note, as well as other texture on the surface. Isolating the true crack from crack-like features and other noise features would require further image processing if using the Sobel or Canny methods. For the out-of-plane fatigue test, even though both the Sobel and Canny edge detector methods demonstrate their ability to identify edge-like features, none of the identified edges represent the true fatigue crack as the crack feature is hidden within the complex textures. On the other hand, the proposed approach is based on tracking the dynamic motion of the specimen surface in a video stream, leading to more robust detection results, even though the detected surface is covered by other crack-like edges or contaminated by complex textures.

Figure 12:
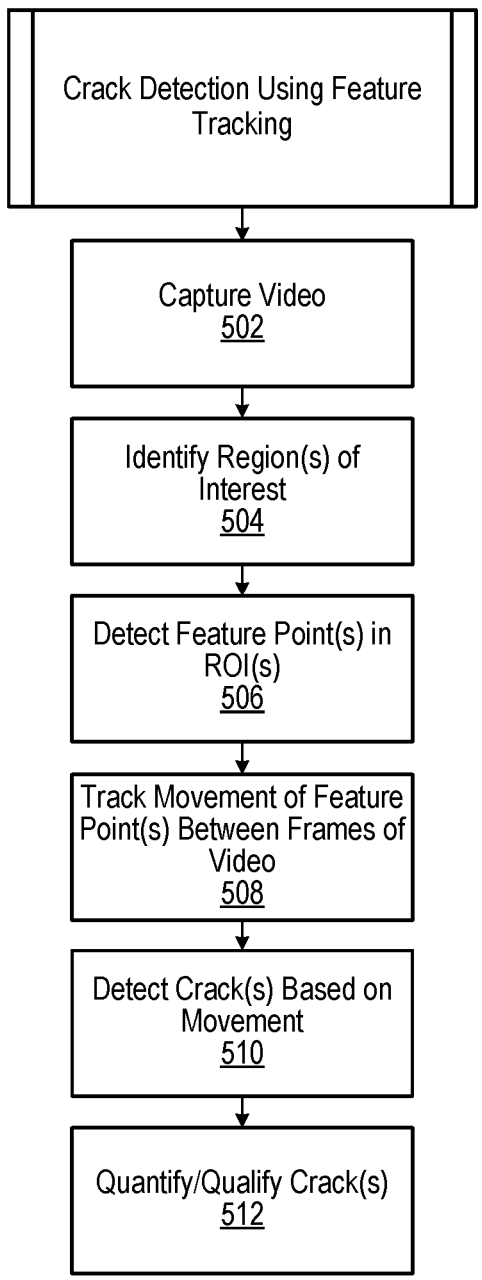
FIG. 12 illustrates a process for computer-vision-based crack detection according to various embodiments described herein.

FIG. 12 illustrates a process for computer-vision-based crack detection according to various embodiments described herein. The process is described in connection with computing device 100 shown in FIG. 3, although other computing devices can perform the process. Although the process diagrams show an order of operation or execution, the order can differ from that which is shown. For example, the order of execution of two or more process steps can be switched relative to the order shown or as described below. Also, two or more process steps shown in succession can be executed concurrently or with partial concurrence. Further, in some examples, one or more of the process steps shown in the process diagrams can be skipped or omitted.

At step 502, the process includes one or more of the image capture devices 20 capturing one or more videos. As described herein, the image capture devices 20 can be positioned to capture videos of civil infrastructure 180, such as buildings, roads, bridges, towers, etc., for the purpose of computer-vision-based fatigue crack detection. The image capture devices 20 can capture a number of different regions or areas of the civil infrastructure 180. The image capture devices 20 can be positioned on tripods, handheld, or carried by one or more UAVs 172. Videos captured by the image capture devices 20 at step 504 can be transferred to the computing device 100 over the network 150, using a local wired connection, by hand transfer using a memory stick or device (e.g., a flash-based memory stick or card), or any other suitable means or method.

At step 504, the process includes the crack detection engine 130 identifying and selecting one or more ROIs in frames of one of the videos captured at step 504. Any suitable ROI or ROIs can be selected for computer-vision-based crack detection. The ROIs can be the size of an entire frame of the videos or a subset region of the frames, depending on the availability of prior knowledge about the approximate location of fatigue cracks and other factors. The ROIs can be selected at suitable dimensions, such as 1700 pixels×900 pixels, in a video with resolution of 1920 pixels×1080 pixels. The ROI can be user- or computer-selected around areas in which fatigue cracks might occur.

At step 506, the process includes the feature tracker 132 detecting feature points in the ROIs selected at step 508. As one example, the feature tracker 132 can implement the Shi-Tomasi algorithm in the ROIs selected at step 508 by searching for all the possible feature points in the ROIs that satisfy Equation 2 above.

At step 508, the process includes the feature tracker 132 tracking the movement of one or more of the feature points detected at step 506. The feature tracker 132 can track the movement $\delta(t)$ of the feature points among a number of frames frames $t_1, t_2, t_3 \ldots t_n$ of the video. To track a particular feature point i between the frames of the video, the feature tracker 132 can estimate the movement of the feature point i between two adjacent frames within the Gaussian window function w(x, y), so that the Sum of Squared Differences (SSD) of an intensity image I(x, y) is minimized. In some cases, the feature tracker 132 can also adopt forward and backward tracking to reliably detect tracking failures based on discrepancies between the forward and backward trajectories for two adjacent frames.

When the image capture devices 20 are handheld or carried by the UAV 172, the videos captured by the image capture devices 20 can exhibit translational and rotational movement among frames. To compensate for such geometric distortions, the feature tracker 132 can also calculate geometric transformation matrixes between an initial frame $t_1$ and subsequent frames $t_2, t_3 \ldots t_n$. With the estimated transformation matrices, the subsequent frames $t_2, t_3 \ldots t_n$ can be registered or recreated as new frames sharing the same coordinate system with the initial frame $t_1$. The feature tracker 132 can then analyze the movement patterns of the feature points i by computing two variables including the relative movement $\delta^i(t)$ of the feature points i from the initial frame $t_1$, and the relative angle change $\theta^i(t)$ of the feature points from the initial frame initial frame $t_1$. $\delta^i(t)$ and $\theta^i(t)$ describe the magnitude and orientation of the movement of each feature point i.

At step 510, the process includes the crack detector 134 detecting cracks based on the movements identified by the feature tracker 132. With reference to FIG. 5 as an example, the crack detector 134 can rely on the standard deviation $S^i$ of $\delta_i(t)$ to quantify the magnitude of movement under repetitive loads. The standard deviations of all feature points within the ROI can be computed as $S^1, S^2, \ldots, S^i$. Then, an LCR is defined for each particular feature point i, which is at the center of the LCR. The movement pattern of all feature points within the LCR is evaluated by computing the coefficient of variation $CV^i$ of the standard deviations $S^1, S^2, \ldots, S^i$ of these feature points located in the LCR at the initial frame. If $CV^i$ is smaller than a predefined threshold Γ, as is the case for the feature points within LCR 1 shown in FIG. 5, then the crack detector 134 determines that all the feature points in the LCR have the same movement pattern (i.e., rigid-body movement). On the other hand, if $CV^i$ exceeds the threshold Γ, as is the case for the feature points 21-26 within LCR 2 shown in FIG. 5, then the crack detector 134 determines that differential movement patterns have occurred in the LCR, indicating the existence of a crack within the LCR.

The crack detector 134 can repeat this procedure for all feature points in the ROI to obtain a vector of coefficient of variation CV. The crack detector 134 can highlight the feature points at the centers of the LCRs with $CV^i$ larger than the threshold Γ. The collection of these highlighted feature points represents a detected point cloud 200, and the crack detector 134 can reference the detected point cloud 200 as an indicator of a path of a detected crack. Because the LCRs are defined based on the locations of feature points in the initial frame, the computation of $CV^i$ is not affected even though some feature points may move outside of the LCR in later frames. When the image capture devices 20 are hand-held or carried by the UAV 172, the crack detector 134 can identify LCRs with differential movement patterns by evaluating $\delta^i(t)$ and $\theta^i(t)$, and the center feature points of those LCRs are highlighted.

At step 512, the process can include the crack qualifier 136 quantifying and qualifying the cracks detected at step 510, such as the size and length of the cracks. According to the example shown in FIG. 2, the crack qualifier 136 can deploy a pair of windows 33 along both sides of the path of the crack 40 in an ROI. The crack qualifier 136 can estimate the movement of each window 33 as the average movement of all feature points within each window 33 using the tracking results obtained by the feature tracker 132. Next, the crack qualifier 136 can obtain the relative movement between the pair of windows 33 by subtracting the movement of the top window 33 from that of the bottom window 33. Using the same process, crack opening measurements at other locations can be achieved by moving or sliding pairs of windows along both sides of the crack 40. The crack qualifier 136 can adjust the number of feature points within each window 33 for accuracy. As one example, the number of feature points within each window 33 can be 5, although smaller or larger numbers of feature points can be encompassed in windows.

The computing environment in FIG. 3 and the process diagram in FIG. 12 show example implementations of the embodiments described herein. The embodiments described herein can be embodied or implemented in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The computing device 100 can include at least one processing circuit. Such a processing circuit can include, for example, one or more processors and one or more storage or memory devices coupled to a local interface. The local interface can include, for example, a data bus with an accompanying address/control bus or any other suitable bus structure. Similarly, the client device 160 can include at least one processing circuit. Such a processing circuit can include, for example, one or more processors and one or more storage or memory devices coupled to a local interface.

The storage or memory devices can store data or components that are executable by the processors of the processing circuit. For example, the crack detection engine 130 and/or other components can be stored in one or more storage devices and be executable by one or more processors in the computing device 100. The crack detection engine 130 can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, and/or programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the crack detection engine 130, can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method for fatigue crack detection, comprising:
capturing a video of a structure under dynamic loading;
detecting a plurality of feature points within a region of interest in a number of frames of the video, the plurality of feature points comprising at least first and second feature points that are present in each of the number of frames;
tracking, across the number of frames of the video, relative differential movement between at least the first and second feature points among the plurality of feature points, where tracking the relative differential movement comprises:
for each feature point among the plurality of feature points, identifying a subset of the plurality of feature points within a localized circular region from that feature point; and
for each subset of the plurality of feature points, evaluating that subset for relative differential movement between combinations of feature points among the plurality of feature points within the localized circular region of that subset;
detecting a crack in the structure based on the relative differential movement between at least the first and second feature points; and
qualifying at least one characteristic of the crack.

2. The method according to claim 1, wherein capturing the video comprises capturing the video of the structure using an image capture device mounted to an unmanned aerial vehicle (UAV).

3. The method according to claim 2, wherein tracking relative differential movement comprises calculating at least one geometric transformation matrix between an initial frame of the video and a subsequent frame of the video to compensate for at least one geometric distortion introduced by motion of the UAV.

4. The method according to claim 1, wherein, for each feature point among the plurality of feature points, the localized circular region from the feature point is defined by a radial distance r from the feature point.

5. The method according to claim 1, wherein detecting the crack comprises, for each subset having relative differential movement between combinations of feature points among the plurality of feature points within the localized circular region, highlighting a central feature point within the subset to be included in a detected point cloud.

6. The method according to claim 5, wherein the detected point cloud surrounds a path of the crack.

7. The method according to claim 6, wherein qualifying at least one characteristic of the crack comprises deploying a pair of windows within the detected point cloud to determine at least one of a size, a shape, or a length of the crack.

8. A system for fatigue crack detection, comprising:
a memory device configured to store computer-readable instructions thereon; and
at least one processing device configured, through execution of the computer-readable instructions, to:
detect a plurality of feature points within a region of interest in a number of frames of a video of a structure under dynamic loading, the plurality of feature points comprising at least first and second feature points that are present in each of the number of frames;
track, across the number of frames of the video, relative differential movement between at least the first and second feature points among the plurality of feature points, where tracking the relative differential movement comprises:
for each feature point among the plurality of feature points, identifying a subset of the plurality of feature points within a localized circular region from that feature point; and
for each subset of the plurality of feature points, evaluating that subset for relative differential movement between combinations of feature points among the plurality of feature points within the localized circular region of that subset;
detect a crack in the structure based on the relative differential movement between at least the first and second feature points; and
qualify a nature of the crack.

9. The system according to claim 8, wherein:
the video is captured using an image capture device mounted to an unmanned aerial vehicle (UAV); and
to track relative movement, the at least one processing device is further configured to calculate at least one geometric transformation matrix between an initial frame of the video and a subsequent frame of the video to compensate for at least one geometric distortion introduced by motion of the UAV.

10. The system according to claim 8, wherein, for each feature point among the plurality of feature points, the localized circular region from the feature point is defined by a radial distance r from the feature point.

11. The system according to claim 8, wherein, to detect the crack, the at least one processing device is further configured to, for each subset having relative differential movement between combinations of feature points among the plurality of feature points within the localized circular region, highlight a central feature point within the subset to be included in a detected point cloud.

12. The system according to claim 11, wherein the detected point cloud surrounds a path of the crack.

13. The system according to claim 11, wherein, to qualify at least one characteristic of the crack, the at least one processing device is further configured to deploy a pair of windows within the detected point cloud to determine at least one of a size, a shape, or a length of the crack.

14. A method for fatigue crack detection, comprising:
detecting a plurality of feature points within a region of interest in a number of frames of a video of a structure under dynamic loading;
tracking, across the number of frames of the video, relative differential movement between a combination of at least two feature points among the plurality of feature points, where tracking the relative differential movement comprises:
for each feature point among the plurality of feature points, identifying a subset of the plurality of feature points within a localized circular region from that feature point; and
for each subset of the plurality of feature points, evaluating that subset for relative differential movement between combinations of feature points among the plurality of feature points within the localized circular region of that subset; and
detecting a crack in the structure based on the relative differential movement between the combination of at least two feature points.

15. The method according to claim 14, wherein tracking relative differential movement comprises calculating at least one geometric transformation matrix between an initial frame of the video and a subsequent frame of the video to compensate for at least one geometric distortion in the video.

16. The method according to claim 14, wherein detecting the crack comprises, for each subset having relative differential movement between combinations of feature points among the plurality of feature points within the localized circular region, highlighting a central feature point within the subset to be included in a detected point cloud.

17. The method according to claim 16, wherein:
the detected point cloud surrounds a path of the crack; and
the method further comprises qualifying at least one characteristic of the crack by deploying a pair of windows within the detected point cloud to determine at least one of a size, a shape, or a length of the crack.

* * * * *